(12) United States Patent
Hayashi et al.

(10) Patent No.: US 8,019,468 B2
(45) Date of Patent: Sep. 13, 2011

(54) TRANSPORT SYSTEM AND TRANSPORT METHOD

(75) Inventors: Takao Hayashi, Aichi (JP); Hiroki Sone, Aichi (JP); Toyokazu Kobayashi, Aichi (JP); Yoshinori Yamada, Aichi (JP); Akiya Inoue, Tokyo (JP); Masayuki Tsujino, Tokyo (JP); Hiromichi Kawano, Tokyo (JP)

(73) Assignees: Murata Kikai Kabushiki Kaisha, Kyoto-shi, Kyoto (JP); Nippon Telegraph and Telephone West Corporation, Osaka-shi, Osaka (JP); Nippon Telegraph and Telephone Corporation, Tokyo (JP)

( * ) Notice: Subject to any disclaimer, the term of this patent is extended or adjusted under 35 U.S.C. 154(b) by 421 days.

(21) Appl. No.: 12/300,203

(22) PCT Filed: Apr. 25, 2007

(86) PCT No.: PCT/JP2007/058924
§ 371 (c)(1),
(2), (4) Date: Nov. 10, 2008

(87) PCT Pub. No.: WO2007/132651
PCT Pub. Date: Nov. 22, 2007

(65) Prior Publication Data
US 2009/0208313 A1 Aug. 20, 2009

(30) Foreign Application Priority Data
May 12, 2006 (JP) .................................. 2006-133261

(51) Int. Cl.
*G06F 19/00* (2011.01)

(52) U.S. Cl. .......................... 700/228; 700/113; 700/121

(58) Field of Classification Search .................. 700/113, 700/112, 226, 228–230, 121; 701/23, 20, 701/19, 25, 200; 401/88.01, 88.02; 404/222.01; 705/28.27, 226
See application file for complete search history.

(56) References Cited

U.S. PATENT DOCUMENTS
5,712,789 A * 1/1998 Radican ........................ 700/226
(Continued)

FOREIGN PATENT DOCUMENTS
JP 9-110137 A 4/1997
(Continued)

OTHER PUBLICATIONS
International Search Report of PCT/JP2007/058924, Mailing Date of Aug. 28, 2008.

*Primary Examiner* — Kidest Bahta
(74) *Attorney, Agent, or Firm* — Westerman, Hattori, Daniels & Adrian, LLP

(57) ABSTRACT

A transport scenario composed of a basic transport (From) from a transport starting point to, e.g., a buffer near the transport destination point and a basic transport (To) from the buffer to the transport destination point is created in response to a transport request of a production controller for transport whose loading times at the transport starting point and at the transport destination point are specified. The buffer is reserved so as to perform the basic transport (From) and the basic transport (To), transport vehicles are allocated, the travel time to the transport starting point or the buffer and the travel time from the transport starting point or the buffer are estimated, and transport instructions are given to the transport vehicles. The possibility that the loading times are out of the specified period is evaluated. If the possibility is larger, the impossibility of a just-in-time transport is notified to the production controller.

5 Claims, 18 Drawing Sheets

U.S. PATENT DOCUMENTS

| | | | |
|---|---|---|---|
| 5,880,958 A * | 3/1999 | Helms et al. | 701/117 |
| 6,401,078 B1 * | 6/2002 | Roberts et al. | 705/28 |
| 6,411,891 B1 * | 6/2002 | Jones | 701/201 |
| 6,892,131 B2 * | 5/2005 | Coffee et al. | 701/200 |

FOREIGN PATENT DOCUMENTS

| | | |
|---|---|---|
| JP | 11-085279 A | 3/1999 |
| JP | 11-119829 A | 4/1999 |
| JP | 2000-235415 A | 8/2000 |
| JP | 2001-296922 A | 10/2001 |
| JP | 2004-227059 A | 8/2004 |
| JP | 2004-281622 A | 10/2004 |

* cited by examiner

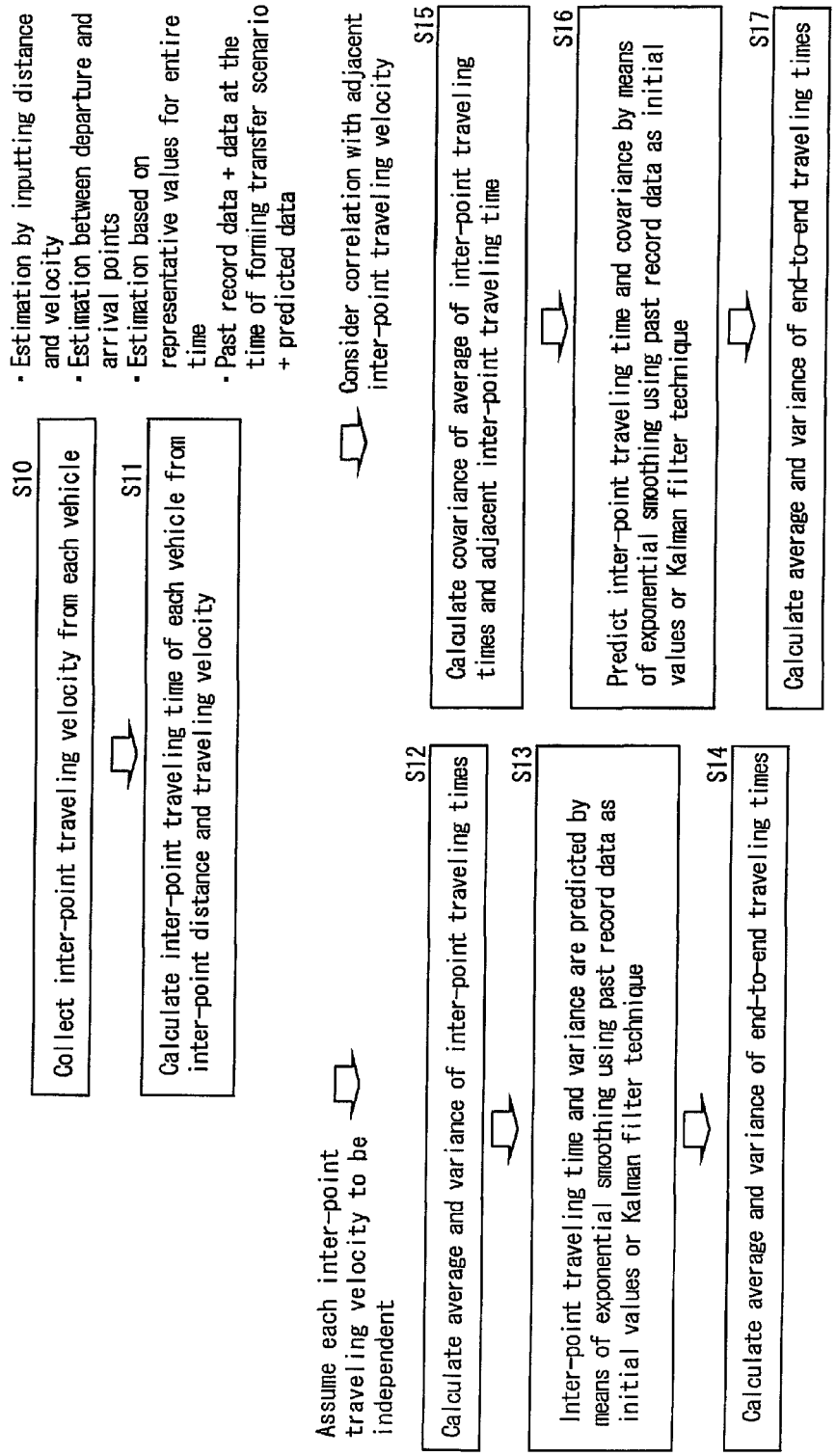

FIG. 11

S20 Collect inter-point traveling times from each vehicle

S21 Sort traveling times from data collected in term T by point pair

Edit inter-point traveling time collected in term T

| Point pair | Observed value (inter-point traveling time) |
|---|---|
| 1-2 | 10, 7, 9, 11, 8, 9, 10 |
| 1-3 | 20, 21, 18, 17, 22, 19 |
| 1-4 | 5, 6, 4, 7, 3 |

S22 Calculate average and variance of inter-point traveling times

Calculation of average and variance

| Point pair | Observed value (inter-point traveling time) | Average | Variance |
|---|---|---|---|
| 1-2 | 10, 7, 9, 11, 8, 9, 10 | 9.1 | 1.8 |
| 1-3 | 20, 21, 18, 17, 22, 19 | 19.5 | 3.5 |
| 1-4 | 5, 6, 4, 7, 3 | 5.0 | 2.5 |

S23 Predict average of traveling times to transfer source by means of exponential smoothing
$Aij(T+1) = \alpha Aij(T) + (1-\alpha)A*ij(T)$
$Aij(T+1)$: predicted value of average of traveling times between points i and j in term T + 1
$Aij(T)$: predicted value of average of traveling time between points i and j in term T predicted in term T − 1
$A*ij(T)$: record value of average of traveling time between points i and j in term T
$\alpha$: smoothing coefficient ($0 < \alpha < 1$)

Prediction of traveling time between respective points

Example
If predicted value of average value of traveling times between points 1 and 2 in term T is 8 seconds, measured value of average value of traveling times between points 1 and 2 in term T is 9.1 seconds, and smoothing coefficient $\alpha = 0.5$, predicted value in term T + 1 is
$0.5 \times 8 + (1 - 0.5) \times 9.1 = 8.55$

FIG. 12

S24
Predict variance of inter-point traveling times by exponential smoothing
$Vij(T + 1) = \alpha Vij(T) + (1 - \alpha)V*ij(T)$
$Vij(T + 1)$: predicted value of variance of traveling times between points i and j in term T + 1
$Vij(T)$: predicted value of variance of traveling times between points i and j in term T predicted in term T − 1
$V*ij(T)$: record value of variance of traveling times between points i and j in term T
$\alpha$: smoothing coefficient ($0 < \alpha < 1$)

Example
If predicted value of variance of traveling times between points 1 and 2 in term T is 2 seconds, measured value of average value of traveling time between points 1 and 2 in term T is 1.8 seconds, and smoothing coefficient $\alpha = 0.5$, predicted value in term T + 1 is
$0.5 \times 2 + (1 − 0.5) \times 1.8 = 1.9$

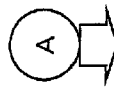

S25
- Assumption: inter-point traveling times are independent from each other
- Input: predicted values of average and variance of inter-point traveling time in term T + 1
- Output: predicted values of average and variance of end-to-end traveling time in term T + 1
- Processing
  - Average of end-to-end traveling times = sum of averages of inter-point traveling times
  - Variance of end-to-end traveling times = sum of variances of inter-point traveling times Example
If average value of traveling times between points i and j is Aij, average value A15 of traveling times between points 1 to 5 is given by the following expression.
$A15 = A12 + A23 + A34 + A45$
If variance of traveling times between points i and j is Vij, variance V15 of traveling times between points 1 and 5 is given by the following expression.
$V15 = V12 + V23 + V34 + V45$

FIG. 13

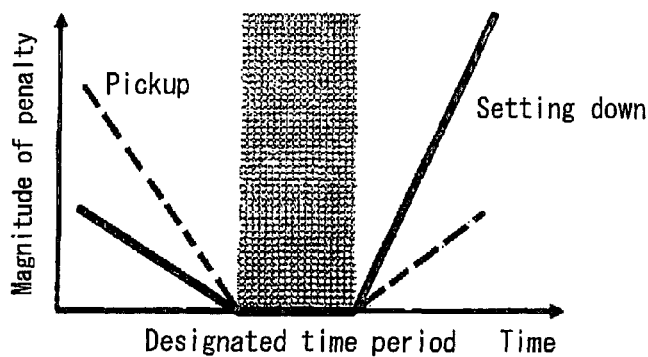

FIG. 14

Calculate smallest value of evaluation value C1(T)

$$C1(T) = \int_0^{+\infty} F1_i(t)g(t+T-t_0)dt$$

$g(t)=-a_1t+a_1t_c \ (t \leqq -t_c)$
$g(t)=0 \ (-t_c \leqq t \leqq t_c)$
$g(t)=a_2t-a_2t_c \ (t_c \leqq t)$ where
C1(T): evaluation value
F1i(t): distribution of time at which empty vehicle arrives at transfer source i (assume normal distribution)
g(t): penalty function
t0: target arrival time
T: transfer start time

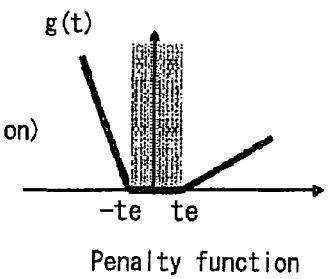

Penalty function

FIG. 16

OHB data management table

| OHB No. | $t_1$ | $t_2$ | $t_3$ | $t_4$ | $t_5$ | $t_6$ | $t_7$ |
|---|---|---|---|---|---|---|---|
| 1 | $FT_4$ | $FT_4$ | $FT_4$ | Empty | Empty | $FT_1$ | $FT_1$ |
| 2 | Empty | Empty | $FT_2$ | $FT_2$ | $FT_2$ | $FT_2$ | $FT_2$ |
| 3 | $FT_3$ | $FT_3$ | $FT_3$ | $FT_3$ | | | |
| ...... | | | | | | | |

48

OHB2
· will not be used at times t1 to t2
· will be used at times t3 to t7 in scenario FT2

OHB3
· will be used at times t1 to t4 in scenario FT3
· is already used at times t1 to t2
· will be continuously used at times t3 to t4
· will not be used at and after time t5

F I G. 19

Arrival time of vehicle for pickup

| Bay No. | t₁ | t₂ | t₃ | t₄ | t₅ | ... |
|---|---|---|---|---|---|---|
| 1 | 0 | 1 | 0 | 2 | 0 | ... |
| 2 | 0 | 1 | 1 | 1 | 1 | ... |
| 3 | 0 | 2 | 1 | 2 | ... | ... |
| ...... | | | | | | |

Indicated is that two vehicles are scheduled to arrive at departure point in bay 3 at time t4 for pickup Setting down finish time

| Bay No. | t₁ | t₂ | t₃ | t₄ | t₅ | ... |
|---|---|---|---|---|---|---|
| 1 | 0 | 2 | 0 | 1 | 1 | ... |
| 2 | 1 | 0 | 1 | 0 | 1 | ... |
| 3 | 2 | 0 | 1 | 1 | 0 | ... |
| ...... | | | | | | |

Indicated is that one vehicle will finish setting down and become empty at departure point in bay 3 at time t4

Management table for the number of allocated vehicles

| Bay No. | T₁ | T₂ | T₃ | T₄ | T₅ | ... |
|---|---|---|---|---|---|---|
| 1 | 0 | 1 | 0 | 2 | 1 | ... |
| 2 | 0 | -1 | 1 | 1 | 0 | ... |
| 3 | 0 | 2 | 1 | 1 | ... | ... |
| ...... | | | | | | |

50

Indicated is that the number of vehicles to be newly required in bay 1 in term T4 is two (the number of vehicles to be required and the number of vehicles to become empty in bay 1 in term T4 are obtained from Tables 1 and 2 and a difference therebetween is given)

TRANSPORT SYSTEM AND TRANSPORT METHOD

TECHNICAL FIELD

The present invention relates to a transport system using transport vehicles such as overhead traveling vehicles, floor-traveling rail guided vehicles, or auto-guided vehicles, and particularly to advance allocation of the transport vehicles by predicting transport instruction issued positions and times.

BACKGROUND TECHNIQUE

It is convenient if a transport vehicle can carry out pickup immediately after a transport instruction is issued. To address this, disclosed in Patent Document 1 (Japanese Laid-Open Patent Publication No. 2001-296922) are to assume that need to transport an article arises after the passage of processing carrying cycle time after the article is carried into a processing device and to allocate a transport vehicle at the time.

DISCLOSURE OF THE INVENTION

Problems to be Solved by the Invention

It is an object of the present invention to estimate and obtain times and positions at which transport vehicles become empty to thereby manage the transport vehicles that will become empty in the future.

It is an additional object of the invention to allocate transport vehicles in advance to transport instructions that will be issued in the future to thereby swiftly process the transport instructions.

It is an additional object of the invention to predict positions and times at which transport instructions will be issued.

Additional objects of the invention are to transport an article to a transport destination processing device at a designated time and to further accurately estimate or predict positions and times at which transport vehicles will become empty and positions and times at which transport instructions will be issued in the future.

It is an additional object of the invention to allocate the same number of empty transport vehicles as the transport instructions that will be issued on an intra-bay route in the future.

It is an additional object of the invention to enable the allocated transport vehicle to arrive at a pickup position at proper time.

It is an additional object of the invention to further accurately predict the number of transport vehicles that will become empty on the intra-bay route.

Means for Solving the Problems

The present invention is a transport system for transporting an article between a plurality of processing devices by a plurality of transport vehicles, the system including estimating means for estimating times at which the transport vehicles complete already-allocated transport instructions by setting down, transport vehicles that will become empty in the future being managed based on the times at which the transport vehicles become empty and which are estimated by the estimating means and positions at which the vehicles become empty.

Furthermore, the invention is a transport method for allocating transport instructions to a plurality of transport vehicles by a controller and transporting an article between a plurality of processing devices by the transport vehicles, the controller estimating times at which the transport vehicles complete the already-allocated transport instructions by setting down and the controller managing the transport vehicles that will become empty in the future based on the estimated times at which the transport vehicles become empty and positions at which the vehicles become empty. In this specification, the description of the transport system holds true of the transport method.

To allocate the transport instruction to the transport vehicle is referred to as allocation.

Preferably, vehicle allocating means for vehicle allocation in order to allocate the empty transport vehicles to the transport instructions that will be issued in the future based on the times at which the transport vehicles become empty and which are estimated by the estimating means and the positions at which the transport vehicles become empty for a purpose of the management is also provided.

More preferably, predicting means for predicting times and positions at which the transport instructions will be issued in the future from the transport instructions already allocated to the transport vehicles is also provided. The vehicle allocating means allocates the empty transport vehicles to the issued positions at the issued times, the positions and times predicted by the predicting means.

Further preferably, buffers for temporarily storing the article are also provided in a plurality of positions. Also provided is transport instruction forming means for issuing two transport instructions, i.e., a transport instruction "From" from the transport source processing device to the stopover buffer and a transport instruction "To" from the stopover buffer to the transport destination processing device when a transport request for which arrival time at the transport destination processing device is designated is input from outside the transport system. The estimating means estimates the time and the position at which the transport vehicle becomes empty from estimated finish time of the allocated transport instruction "From", a position of the stopover buffer, estimated finish time of the allocated transport instruction "To", and a position of the transport destination processing device. The predicting means predicts the time and the position at which the transport instruction will be issued in the future at least from the position of the stopover buffer and the pickup time in the transport instruction "To".

Preferably, a traveling route for the transport vehicles includes a plurality of intra-bay routes along bays in which the processing devices are disposed and an inter-bay route connecting the intra-bay routes. The vehicle allocating means allocates an empty vehicle from another part of the traveling route based on a difference between the number of issues of the transport instructions for carrying out pickup in each of the intra-bay routes and the number of transport vehicles that become empty on the intra-bay route, the number of issues predicted by the predicting means and the number of transport vehicles estimated by the estimating means.

More preferably, the predicting means predicts the number of transport vehicles that become empty in each intra-bay route from the number of allocated transport instructions whose transport destinations are on the intra-bay route.

Preferably, also provided are means for estimating a traveling time from a current position of the transport vehicle allocated by the vehicle allocating means to a pickup position according to the transport instruction and allocation means for allocating the transport instruction so that the transport vehicle arrives at the pickup position at predetermined time based on the estimated traveling time.

Effects of the Invention

In the invention, the time at which a transport vehicle becomes empty is estimated from the allocated transport instruction by using the traveling time and transfer time from the finish of setting down to completion of the transport instruction. The position at which the transport vehicle becomes empty is obtained from the destination in the transport instruction. If the times and positions at which the transport vehicles become empty can be estimated, it is possible to move the vehicle from an area where there is a surplus of vehicles to an area short of vehicle.

Here, if the transport vehicle is allocated in advance into a position, e.g., a bay, suitable for execution of the transport instruction that will be issued in the future based on estimation of the time and the position at which the transport vehicle becomes empty, it is possible to efficiently process the transport instruction. Moreover, prediction of execution start time and finish time of the transport instruction becomes easy and quality of the transport is improved.

In some cases, time and a position at which a new transport instruction will be issued can be predicted from the transport instruction already allocated to the transport vehicle. For example, when a processing time of a carried-in article by a processing device is known and if a transport instruction for transporting an article to one processing device is allocated to a transport vehicle, time at which the transport vehicle carries the article in the processing device can be predicted and time at which the processed article should be carried out of the processing device can be predicted. Therefore, if the transport vehicle is allocated at the predicted time and position at which the transport instruction is issued, it is possible to further efficiently execute the transport instruction.

Here, if the two transport instructions, i.e., the transport instruction "From" from the transport source processing device to the stopover buffer and the transport instruction "To" from the stopover buffer to the transport destination processing device are issued in response to the transport request for which arrival time at the transport destination processing device is designated, the article can arrive at the designated time by allocating the transport instruction "To" to the transport vehicle so that the article arrives at the transport destination processing device at the designated time from the stopover buffer.

Moreover, from the estimated finish time of the allocated transport instruction "From", the position of the stopover buffer, the estimated finish time of the allocated transport instruction "To", and the position of the transport destination processing device, it is possible to estimate the position and time at which the transport vehicle becomes empty. The estimated finish time of the transport instruction "To" may be estimated from the traveling time or the like of the transport vehicle or the designated arrival time may be used as the estimated finish time.

Furthermore, the predicting means can predict the time and position at which the transport instruction will be issued in the future at least from the position of the stopover buffer and the pickup time in the transport instruction "To". If the transport start time from the transport source processing device is designated in the transport request, the start time of the transport instruction "From" is also designated and it is possible to predict the time and position at which the transport instruction will be issued in the future from it. Therefore, it is possible to estimate issued times and positions of a greater number of transport instructions.

With the above, the positions and times at which the transport vehicles become empty can be predicted more accurately, the times and positions at which the transport instructions will be issued in the future can be predicted more accurately, and the articles can arrive at the transport destination processing devices at designated times.

A difference between the number of issues of the transport instructions for carrying out pickup in each intra-bay route and the number of transport vehicles that become empty on the intra-bay route corresponds to excess or deficiency of the transport vehicles, the number of issues estimated by the estimating means. Therefore, based on the difference, the transport vehicle is allocated from another part of the traveling route when the transport vehicles are insufficient. In this way, it is possible to allocate the required number of empty transport vehicles to the respective intra-bay routes.

Especially, the number of allocated transport instructions having the transport destinations in a certain intra-bay route is the number of transport vehicles that become empty on the intra-bay route when the transport instructions finish. Based on this number, it is possible to easily and accurately predict the positions and times at which the transport vehicles become empty. The number of allocated transport instructions having the transport sources (pickup positions) on a certain intra-bay route is the number of transport vehicles required on the intra-bay route due to allocation.

If the traveling time from the current position of the allocated transport vehicle to the pickup position according to the transport instruction is estimated and the transport instruction is allocated so that the transport vehicle arrives at the pickup position at predetermined time based on the estimated traveling time, the transport vehicle can arrive at the pickup position when needed.

BRIEF DESCRIPTION OF THE DRAWINGS

FIG. 10 is a view showing a calculation algorithm of an average and a variance of end-to-end traveling times in the embodiment.

FIG. 11 is a flow chart showing a prediction algorithm of prediction and a variance of the end-to-end traveling times in the embodiment.

FIG. 12 is a flow chart showing the prediction algorithm of prediction and a variance of the end-to-end traveling times after a connector A in FIG. 11.

FIG. 13 is a graph showing an example of a penalty function for an error in an arrival time with respect to a designated time period in the embodiment.

FIG. 14 is a view showing evaluation of a predicted arrival time at a transport source in the embodiment.

FIG. 16 is a view schematically showing a buffer management table in the embodiment.

FIG. 19 is a view schematically showing a management table for the number of allocated vehicles in the embodiment.

Figure 1:
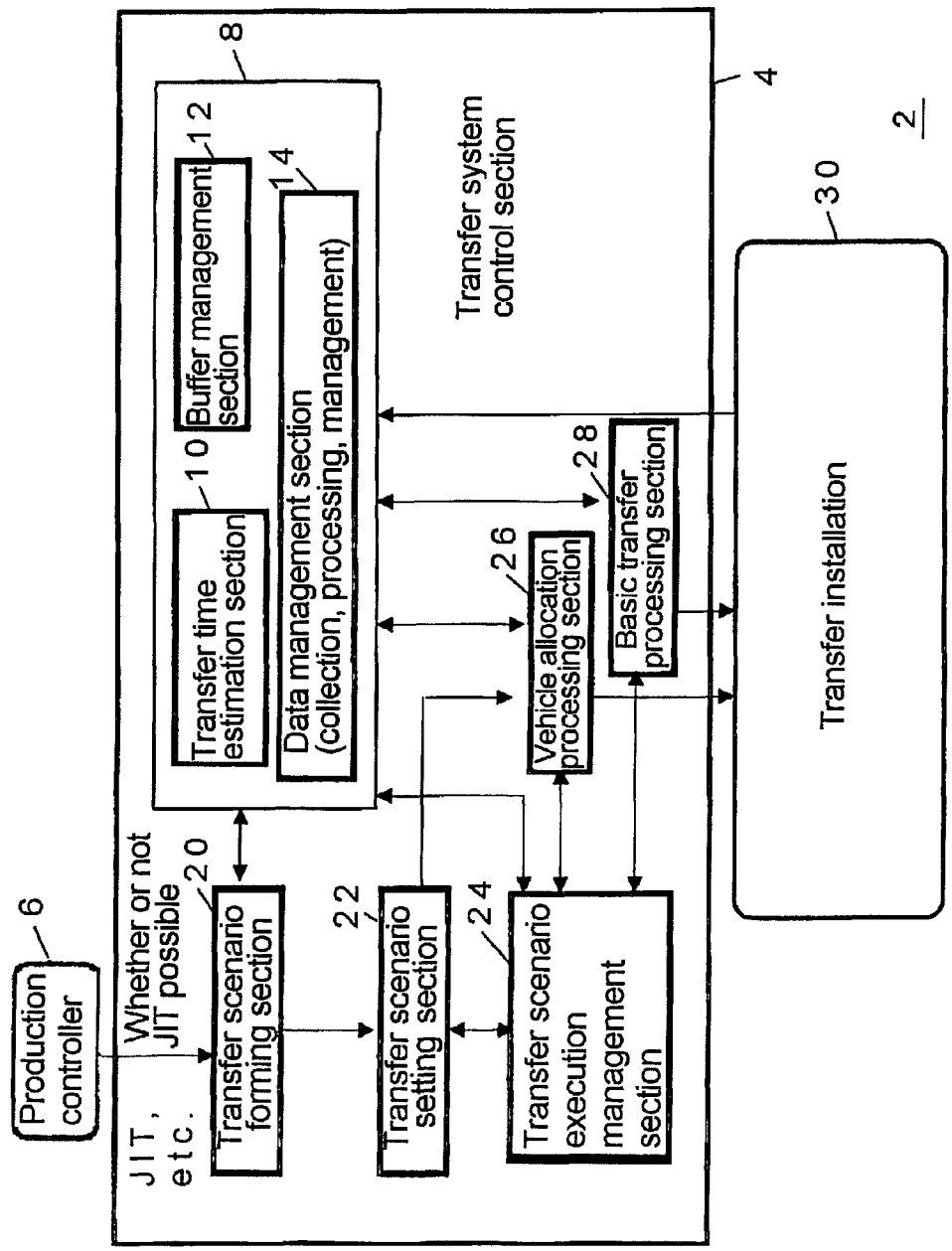
FIG. 1 is a block diagram of a control system of a transport system of an embodiment.

DESCRIPTION OF REFERENCE NUMERALS 2 transport system
4 control system
6 production controller
8 management section
10 transport time estimation section
12 buffer management section
14 data management section
20 transport scenario forming section
22 transport scenario setting section
24 transport scenario execution management section
26 vehicle allocation processing section
28 basic transport processing section
30 transport installation
32 inter-bay route
34 intra-bay route
35 processing device
36 overhead traveling vehicle
38 buffer
40 transport scenario
42, 43 transport time record data
44 transport scenario management table
46 transport time record database
48 overhead buffer management table
50 management table for the number of allocated vehicles

BEST MODE FOR CARRYING OUT THE INVENTION

The most suitable embodiment for carrying out the present invention will be described below.

Embodiment

FIGS. 1 to 23 show a transport system 2 of the embodiment by taking an overhead traveling vehicle system for example. In each drawing, reference numeral 4 designates a control system for communicating with an external controller such as a production controller 6 to receive a transport request. Especially in a case of a JIT (just-in-time) transport request, a pickup or setting-down time period is designated. The control system 4 reports whether or not the JIT transport is possible and an execution status of a transport instruction to the production controller 6. If the JIT transport is impossible, the production controller 6 makes the same request again as another transport request such as a priority transport and a normal transport.

A management portion 8 includes a transport time estimation section 10, a buffer management section 12, and a data management section 14. The transport time estimation section 10 accumulates records of transport times of an overhead traveling vehicle and stores averages, standard deviations, and the like of the transport times between points, bays, and the like. The transport time estimation section 10 outputs estimated values of traveling times from a current position of the overhead traveling vehicle to a traveling destination pickup point, setting-down point, and the like, predicted values of variation (distribution) of the traveling times, e.g., standard deviations of estimated values of distribution of the traveling times and outputs evaluation values on deviations from designated arrival times in response to inquiries from a transport scenario forming section 20, a transport scenario execution management section 24, and the like. The buffer management section manages occupied/empty states of a buffer, a storage shed, and the like in the transport system 2 and reserves the buffer and the storage shed for the transport instruction and for basic transport especially in a case of the JIT transport. The data management section 14 is a database for collecting, analyzing, and managing various data in the transport system 2. The transport times out of the data are managed by a database of the transport time estimation section 10.

The transport scenario forming section 20 forms a transport scenario for the JIT transport. For the priority transport and the normal transport other than the JIT transport, a transport instruction forming section and an execution management section may be provided separately or the normal transport may be processed as JIT transport for which longer time periods are designated as a pickup time and a setting-down time. The priority transport may be regarded as JIT transport in which the earlier the pickup time and the setting-down time, the better, and a penalty increases steadily with the passage of time since allocation of the transport request, i.e., allocation of the transport instruction to the transport vehicle such as the overhead traveling vehicle. The transport scenario for the JIT transport is formed of a first transport instruction (basic transport "From") from a transport source to the buffer and a second transport instruction (basic transport "To") from the buffer to a transport destination. The number of the basic transports increases as the number of stopover buffers increases. If it is close to the designated setting-down time, a direct transport without stopping over at the buffer is selected. Schedules for the respective basic transports (basic transport "To", basic transport "From") are formed by the transport scenario forming section 20.

A transport scenario setting section 22 accumulates the transport scenarios while asking a vehicle allocation processing section 26 to allocate vehicles so that an empty overhead traveling vehicle exists where and when needed. An execution status of the set transport scenario is managed by the transport scenario execution management section 24. If the execution status does not meet the schedule for the basic transport, the transport scenario is revised. In an extreme case, the JIT transport is impossible and changed to the normal transport or the like and the production controller 6 is informed of the change. In this case, the production controller 6 is also informed of the latest estimated pickup or setting-down time. A basic transport processing section 28 allocates the transport instruction to the overhead traveling vehicle at a predetermined time and the buffer management section 12 reserves a shelf of the optimum buffer to carry out the basic transport.

Figure 2:
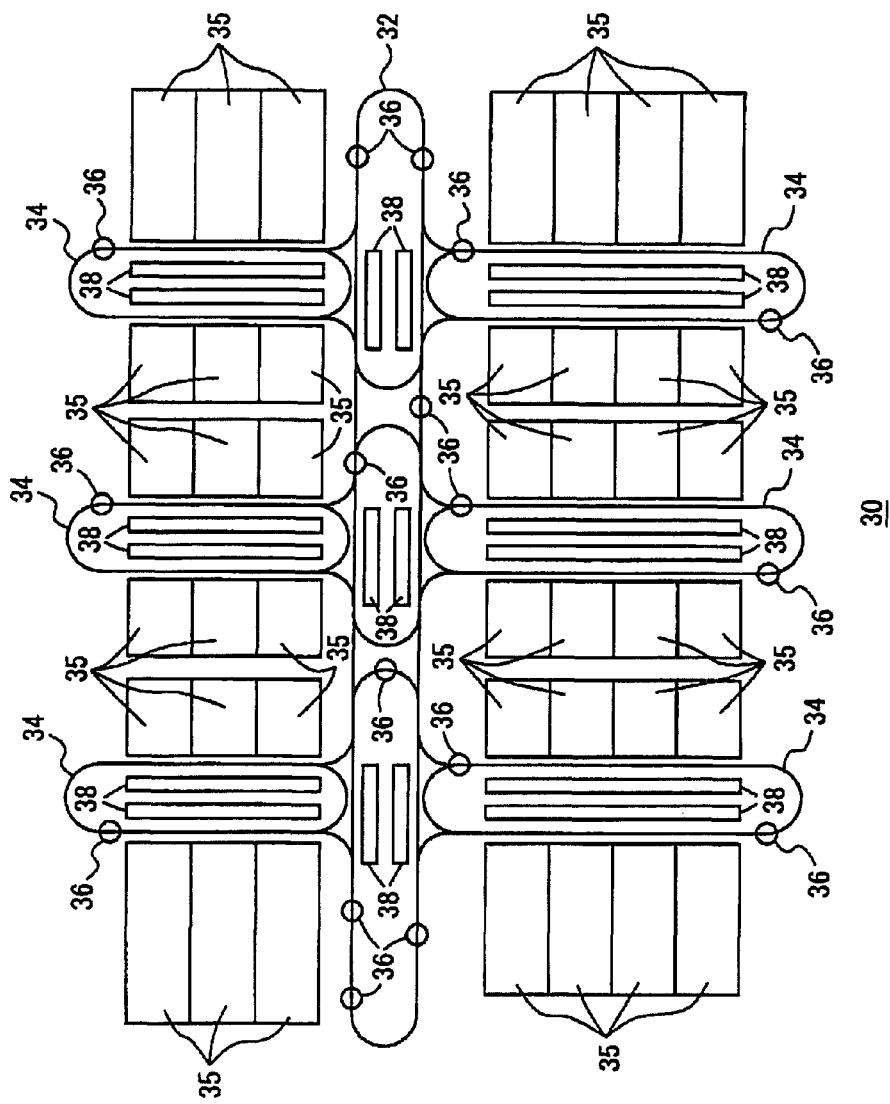
FIG. 2 is a plan view of a layout of a transport installation of the embodiment.

A transport installation 30 includes the overhead traveling vehicles 36, the buffers 38, an inter-bay route 32, and intra-bay routes 34 shown in FIG. 2. The buffers 38 may be overhead buffers (OHB) to and from which an article is directly delivered and received from and to the overhead traveling vehicles 36 or may be buffers below the routes 32, 34. In the following description, the overhead buffers are taken for example. Preferably, the overhead traveling vehicle 36 is provided with a mechanism for moving a hoist (elevation frame) for handing and receiving the article to and from the loading and unloading port between a position directly below and a position beside a traveling rail and the overhead buffers are provided beside the traveling rail. In this way, the overhead buffers can be provided without being affected by the layout of loading and unloading ports and the like and the overhead buffers can be provided in suitable positions for the JIT transport. The inter-bay route 32 and the intra-bay routes 34 are collectively called the "traveling route" and the intra-bay routes 34 may be simply called "bays" in some cases where there is no possibility of misunderstanding. The plurality of overhead traveling vehicles 36 and the buffers 38 are provided and especially the buffers 38 are provided for the plurality of articles at each of the intra-bay routes 34 and the inter-bay route 32.

To reserve the buffer means to reserve one shelf of the buffer. It is also possible to use a storage shed having a stocking and delivering device such as a stacker crane instead of the buffer. However, a distance from the storage shed to a transport destination processing device is long in general and time for operation of the stocking and delivering device is needed. Therefore, traveling time from the storage shed to the processing device varies widely. Consequently, the storage shed is not suitable for the JIT transport and the buffer is preferable. The traveling route is provided with a large number of shortcuts and bypasses in case of trouble of the traveling rail or to avoid the congestion and partially has two tracks for use in waits and overtaking involved in the vehicle allocation. Illustration in FIG. 2 is simplified as compared with an actual route.

The plurality of processing devices 35 are provided to face the intra-bay routes 34. One or more loading and unloading ports below the traveling rail of the intra-bay route 34 are provided to the processing device 35 and hand and receive the articles such as semiconductor cassettes to and from the overhead traveling vehicles 36. The processing device 35 also includes an inspection device and the like. Both the transport source (a start point and represented by "From") and transport destination (represented by "To") are loading and unloading ports in principle. Terms used in the embodiment will be described below.

Table 1 Terms

Just-in-time transport (JIT transfer): Transport in which a pickup time at a transport source or a setting-down time at a transport destination is designated; the designated time is normally given as a time period (designated time period).

Transport scenario: A scenario (plan) for a transport to comply with transport request data; in a case of the JIT transport, the scenario is formed of at least two steps, i.e., the basic transport "From" from the transport source to an intermediate buffer and the basic transport "To" from the intermediate buffer to the transport destination. If the number of intermediate buffers to stop over at is two or greater, the number of the basic transports is greater than two. The basic transport is a unit of transport that cannot be divided any more and includes steps of transport vehicle's traveling to the loading and unloading port or the buffer (storage shed) at the pickup point, pickup, and setting down at the loading and unloading port, the buffer, or the storage shed at the setting-down point. If the basic transport is divided into travel and transport in the description, the pickup and setting down are regarded as parts of the transport. In this case, the basic transport is divided into two, i.e., the empty "travel" without the article and the "transport" handling the article.

Table 2 Terms (Continued)

Transport request: A request from the controller such as the production controller outside the transport system to transport the article; an instruction from a controller in the transport system to the transport vehicle, by contrast, is a transport instruction. Check of progress following the transport instruction by a transport vehicle controller is referred to as tracking. A report on a state of transport from the transport vehicle controller to the external controller is referred to as a "transport report". There are three kinds of transport requests, i.e., a JIT transport request, a priority transport request, and a normal transport request, but all of them may be made as the JIT transport request.

JIT transport request: A transport request for which a time (time period) for at least one of pickup at the transport source and setting down at the transport destination is designated; by achieving the JIT transport, efficiency of a semiconductor processing device and the like increases and productivity is expected to increase.

Normal transport request: A transport request without designated time and ordering of priority or a lowest-priority transport request.

Priority transport request: A request without special designated time but having higher priority than the lowest priority. The request has precedence over the normal transport request. The order in which the JIT transport request and the priority transport request are executed is not defined uniformly. If it is close to the time designated by the JIT transport request, the JIT transport request takes precedence. If there is extra time until the time designated by the JIT transport request, the priority transport request takes precedence.

Table 3 Terms (Continued)

Basic transport processing: Processing in the control system for carrying out the basic transport and is, for example, formed of
  transport vehicle allocation for instructing a transport vehicle to execute a specific basic transport,
  traveling route search for determining a traveling route from the basic transport and correction of the traveling route
  travel of the transport vehicle to a transport source loading and unloading port or buffer,
  pickup of an article at the transport source loading and unloading port or buffer,
  travel of the transport vehicle to a transport destination,
  congestion avoidance for determining or changing a traveling route so as to avoid congestion in the traveling route, and
  setting down of the article at the transport destination.

JIT achievement ratio: A ratio of success in transport at the designated time to the JIT transport requests; deviation from the designated time is evaluated based on a penalty function and a time difference from the designated time.

Average value determination: A method for determining whether or not the JIT transport is possible based on an average value of past record data; in the embodiment, an average value and a variance of the past record date are used to evaluate the possibility of achievement of JIT transport by obtaining a composition product with a penalty function and whether or not the JIT transport is possible is determined based on the evaluation in the embodiment.

Insured accuracy specification determination: Determination of whether or not the possibility of the JIT transport exceeds a specified percentage, the possibility obtained from the past record data.

Table 4 Terms (Continued)

Direct transport: A direct transport from the transport source to the transport destination without stopping over at the buffer; the direct transport is a part of the JIT transport on condition that the transport is carried out at the designated time.

Schedule of the basic transport: A schedule for every kind of timing in the basic transport; the schedule is formed of a start time of the basic transport (allocation to the transport vehicle), a transport vehicle arrival time at the transport source estimated from the basic transport start time, an estimated value of pickup finish time at the transport source, and an estimated value of transport vehicle arrival time at the transport destination, an estimated value of setting-down finish time at the transport destination, and the like. The transport source and the transport destination may be the loading and unloading ports or the buffers.

Estimated time From: An estimated time from the start of the basic transport to the finish of the pickup of the transported article.

Estimated time "To": An estimated time from the start of the basic transport to the finish of setting down of the transported article.

Estimated time "−From", Estimated time "+From": An estimated time from the start of the basic transport to the finish of the pickup at the transport source X allowing for risk factors of −(early), +(late); an estimated time "−To" and an estimated time "+To" are defined similarly.

Buffer: A place where the transport system temporarily stocks articles and includes a storage shed having a stocking and delivering device such as a stacker crane in a broad sense. In principle, it means a buffer which is provided along the traveling route and from and to which the transport vehicle directly receives and delivers the article. Out of the buffers, ones provided parallel to the traveling route and on a ceiling portion are overhead buffers (OHB).

Transport vehicle: An overhead traveling vehicle, a floor-traveling rail guided vehicle, or a rail-less floor traveling auto-guided vehicle referred to as a vehicle in some cases.

The available number of transport vehicles: The number of empty transport vehicles to which the basic transports can be allocated at a certain time. The number is counted for each bay.

Figure 3:
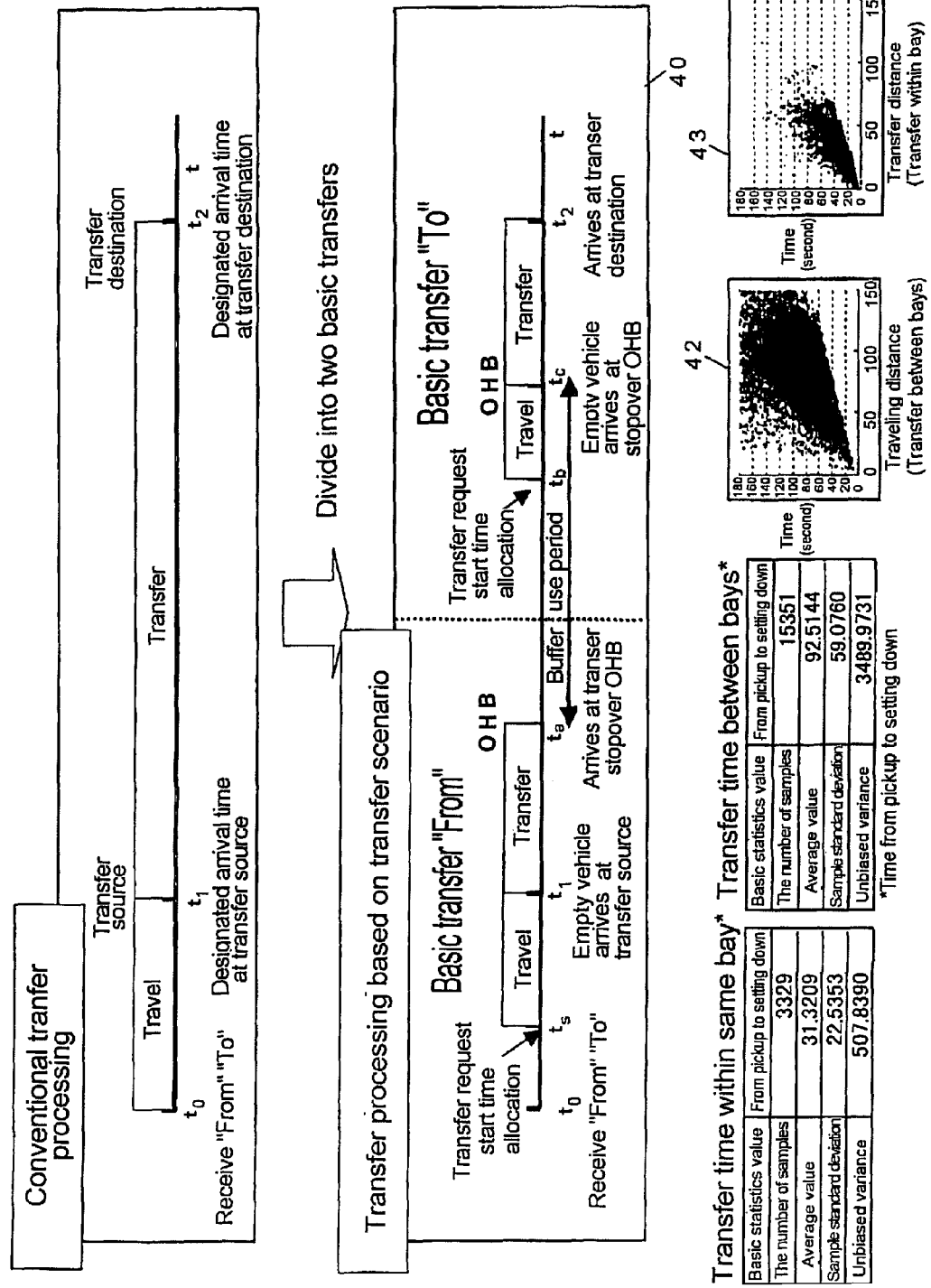
FIG. 3 is a view for describing "a transport scenario" in the embodiment.

FIG. 3 shows a meaning of a transport scenario 40. A transport request is formed of "From" data and "To" data each of which includes a number of a loading and unloading port of a processing device, a lot number or an ID of an article, a designated arrival time, and the like. To enable a transport vehicle such as an overhead traveling vehicle to arrive at a transport source at a designated transport source arrival time t1 and to enable a transport vehicle to arrive at a transport destination at a designated transport destination arrival time t2 in response to the transport request, a transport instruction is allocated so that a transport vehicle arrives at the transport source at the designated time t1 and the vehicle transports to an intermediate buffer. Then, a transport instruction is allocated to another transport vehicle, for example, so that the vehicle arrives at the transport destination at the time t2. As a result, one transport request is divided into the basic transport "From" and the basic transport "To". In a case of stopping over at a plurality of buffers at intermediate points, a basic transport "Int" is added therebetween. As is apparent from the above description, a JIT transport aims not at minimizing a transport time but at avoiding a backlog of articles in a processing installation and minimizing a time for the processing installation to wait for an article. Even if a transport time for each article is long, minimizing of the waiting time for the processing installation means that the transport system supplies optimum service to a production system. If it is close to the designated transport destination arrival time t2, the direct transport may be carried out. The times t1, t2 are used as designated time periods having leeway in practice.

To achieve the JIT transport, the transport vehicles at least need arrive at a "From" position and a "To" position at the times t1, t2, which is based on the premise that traveling times of the transport vehicles can be estimated accurately. For this purpose, the transport time estimation section 10 in FIG. 1 stores transport time record data 42, 43 in a lower portion of FIG. 3 in a database that returns a statistics value such as distribution of traveling time record values or an average and a standard deviation of the record values in response to a traveling distance or an intra-point or intra-bay argument.

Figure 4:
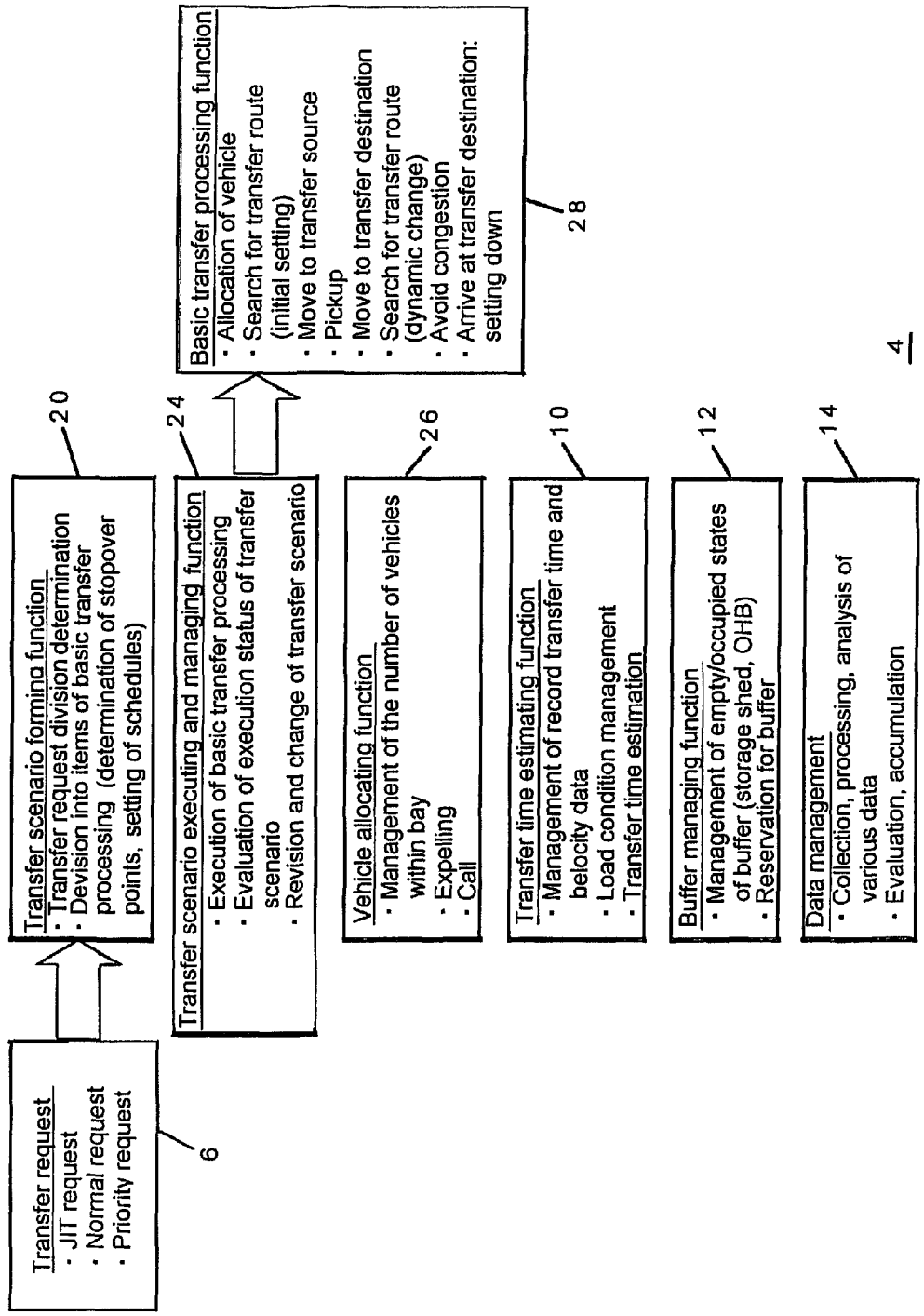
FIG. 4 is a view for describing the control system of the embodiment from a functional viewpoint.
Figure 5:
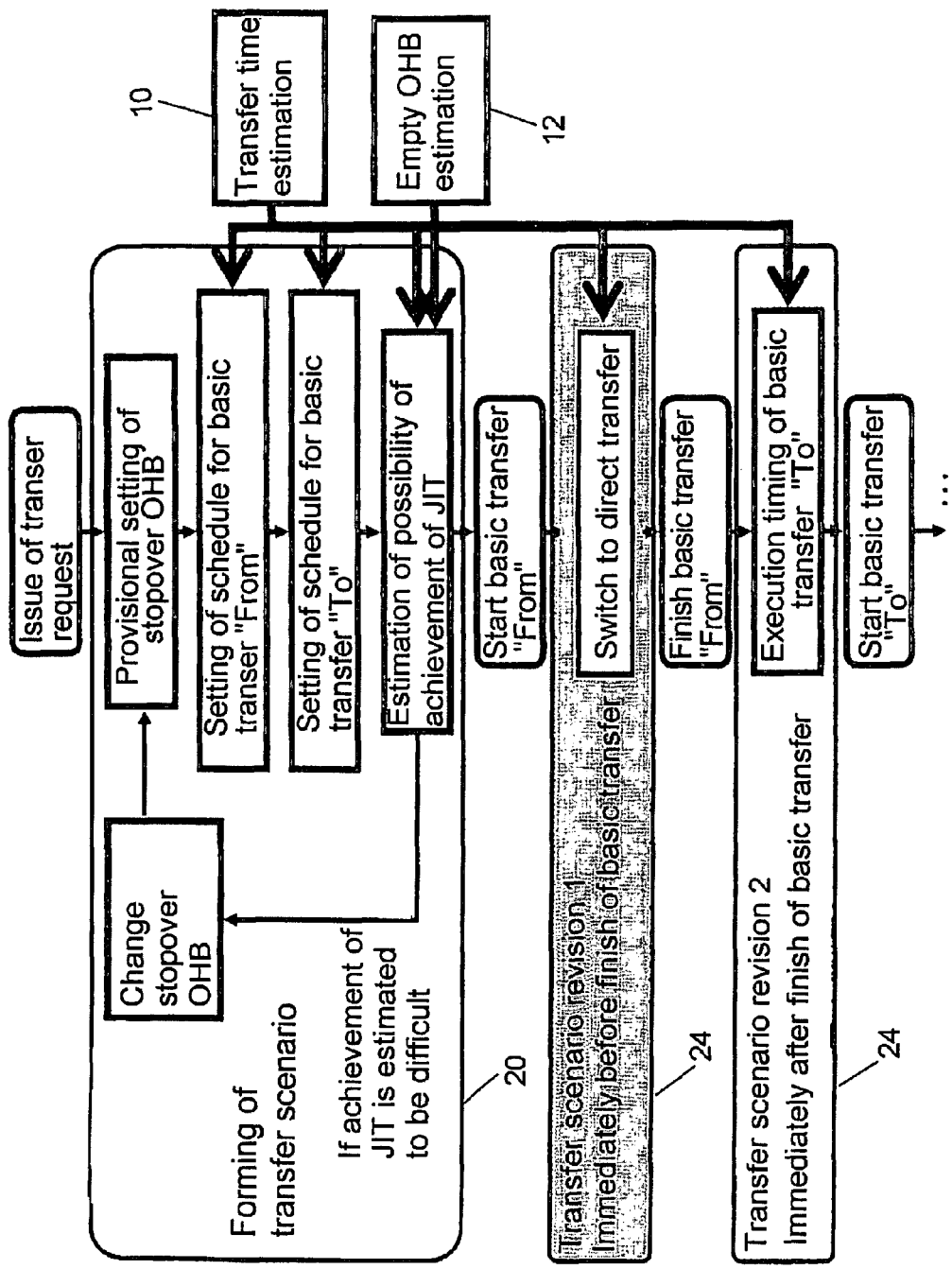
FIG. 5 is a chart showing procedures to form and revise the transport scenario in the embodiment.

Functions for achieving the JIT transport are shown in FIGS. 4 and 5. Reference numerals in the drawings correspond to those in FIG. 1 and designate places (means) for achieving the respective functions. A transport scenario forming function is achieved by the transport scenario forming section 20 that determines whether or not the JIT transport is possible in response to the transport request, divides the transport request into the basic transports when the JIT transport is possible, determines the stopover buffer(s), and fixes schedules for the respective basic transports.

To form the transport scenario, (1) Whether or not the JIT transport is possible is determined. Three determinations a, b, and c are made according to a request pattern of the JIT transport.

(a) Determination whether or not the JIT transport to a transport source is possible.

(b) Determination whether or not the JIT transport to a transport destination is possible.

(c) Determination whether or not the JIT transport to the transport source and the transport destination is possible.

(2) Whether or not the JIT transport is possible is determined based on any of three options: a, b, and c.

(a) Average value determination: determine based on an average value of expected arrival times.

(b) Insured accuracy specification determination: determine based on whether or not there is a specified percent probability that a designated time is met.

(c) Determination based on a penalty function: determine the penalty function as a function of deviation (early arrival, late arrival) from the designated time and determine based on whether or not a penalty is a value not over a specified value.

(3) In the function of dividing and processing the JIT transport request, one of methods is chosen to perform processing in each of function options, a, b, and c.

(a) A function of determining the number of stopovers: choose one method from options i to iv.

(i) Set a common value for every pair of a transport source and a transport destination.

(ii) Set an upper limit according to a distance between the transport source and the transport destination.

(iii) Set an upper limit according to a requested transport time to the transport destination.

(iv) Set an upper limit in consideration of a distance and a requested transport time to the transport destination.

If the transport destination is far away, it is possible to stop over at a plurality of buffers. In this case, it is possible to reduce variation in the arrival time at a final transport destination as compared with a case where the stopover buffer is fixed to one. In this case, an intermediate basic transport "Int" is added and a transport schedule for the basic transport "Int" is determined on condition that setting down at a buffer in the last basic transport is finished before a pickup time at the buffer and so that setting down at each buffer is finished before a pickup time at each buffer.

(b) A stopover buffer determining function: select one method from options i to v.

(i) Determine in consideration of only the distance to the transport destination.

(ii) Determine in consideration of the transport time to the transport destination.

(iii) Determine the distance and the transport time to the transport destination.

(iv) Determine in consideration of the distance to the transport destination and a load condition in a transport destination bay.

(v) Determine in consideration of the transport time to the transport destination and the load condition in the transport destination bay.

If the stopover buffer is far from the transport destination or a route between them is congested, variation in the arrival time becomes great. By utilizing upstream one of buffers within the same bay in the vicinity of the transport destination, it is possible to reduce the variation in the arrival time.

(c) A function of determining the load condition in the bay: select one method from options i, ii.

(i) Determine the load condition in the bay based on the number of transport vehicles in the bay and an average velocity.

(ii) Determine the load condition in the bay based on the number of setting-down and pickup transport vehicles in the bay at an assumed time according to the formed transport scenario.

Determination of the load condition in the bay is utilized for estimation of the transport time.

The transport scenario forming section 20 preferably forms transport scenarios in response to the priority transport request and the normal transport request other than the JIT transport and forms the transport scenario according to an evaluation function (penalty function) for the deviation from the designated arrival time when the evaluation function is specified in the JIT transport. Therefore, the transport scenario forming section 20 further has the following functions.

(1) Transport scenario forming (four settings according to the request pattern of the JIT transport are possible)

(a) A function of forming a scenario in response to a transport request for which an arrival time at the transport source is designated.

(b) A function of forming a scenario in response to a transport request for which an arrival time at the transport destination is designated.

(c) A function of forming a scenario in response to a transport request for which arrival times at the transport source and the transport destination are designated.

(d) A function of forming a scenario in response to a priority transport request.

(2) A scenario forming condition determining function (select one method from options a, b)

(a) A function of forming a scenario in response to a transport request for which an arrival time and a percentage of tolerance of variation from a designated time are specified, e.g., arrival B % of the time within the designated time+A seconds.

(b) A function of forming a scenario in response to a transport request in which a deviation from the arrival time is given as the evaluation function and an evaluation value is not over a designated value.

For the transport scenario in execution, the transport scenario execution management section 24 observes the transport time and a state of congestion in the traveling path, detects a deviation of an observation value from a value estimated in forming the scenario, and revises the transport scenario to correct the deviation. A transport scenario revising function is performed by the transport scenario execution management section 24 through the basic transport processing section 28. The transport scenario revising function has the following functions.

(1) A transport scenario deviation detecting function: select one method from options a, b.

(a) Detect the arrival time and the deviation from the designated time based on percentages of the designated tolerance.

(b) Detect the arrival time and the deviation from the designated time based on values obtained from the evaluation function.

(2) A transport scenario revision processing executing function: choose one method from options a, b.

(a) A function of periodically revising suspension of division, the number of stopovers, the stopover storage shed, the stopover overhead buffer(s), the transport start time.

(b) A function of revising suspension of division, the number of stopovers, the stopover overhead buffer(s), the transport start time when an vent occurs (finish of pickup or arrival at the stopover storage shed or the stopover overhead buffer)

Revision of the transport scenario is the function to ensure that pickup and setting down are carried out at the designated times according to system conditions such as a delay in the basic transport "From", congestion in the traveling route, and occupancy of the buffer.

The transport scenario executing and managing function further includes an allocating time setting function. The allocating time setting function sets a time to allocate the transport instruction (basic transport) to the transport vehicle. In response to the allocation, the transport vehicle starts to travel to the pickup point. This function includes the following functions.

(a) A function of setting a transport request start time (allocation) to the transport source in response to the transport request ("From" "To" data) for which the JIT transport is designated.

(b) A function of setting a transport request start time from the stopover storage shed or the stopover overhead buffer for the transport request in response to which the transport to the stopover storage shed or the stopover overhead buffer has been carried out.

The transport vehicle immediately starts traveling to the pickup point in principle after the allocation. Therefore, arrival of the transport vehicle at a predetermined position at a predetermined time is achieved by controlling the allocating time.

A buffer managing function is achieved by the buffer management section 12 that predicts empty/occupied states of the buffers such as the storage shed and the overhead buffer in the future and determines availability of the buffers to help form the transport scenario. The section also reserves the buffer, selected as a stopover point in the transport scenario, for a use period estimated in the transport scenario. The buffer managing function manages not only current usage but also the time when a change in the empty/occupied state is expected due to execution of the formed transport scenario. However, in some cases, the buffer management may be revised depending on presence or absence of a special buffer area that can be used by the JIT transport request.

A transport time estimating function is achieved by the transport time estimation section 10. This function obtains an estimated transport time at the point of estimation based on the current execution status of the transport and the past execution status of the transport. This function includes the following elements.

(1) A transport time estimating function: choose one method from options a, b.

(a) Estimate the transport time by inputting time (Choose one method from options (i) & (iii), (i) & (iv), (ii) & (iii), (ii) & (iv))

(i) Estimation between bays: estimate from a representative value for a bay.

(ii) Estimation between points: estimate between departure and arrival points.

(iii) Entire time zone common estimation: estimation based on representative values for the entire time.

(iv) Estimation for each time zone: estimation based on a representative value for a designated time zone.

(b) Estimate the transport time by inputting the distance and velocity.

(choose one method from options (i) & (iii), (i) & (iv), (ii) & (iii), (ii) & (iv))

(i) Estimation between bays: estimate from a representative value for a bay.

(ii) Estimation between points: estimate between departure and arrival points.

(iii) Entire time zone common estimation: estimation based on representative values for the entire time.

(iv) Estimation for each time zone: estimation based on a representative value for a designated time zone.

In each of (a) and (b), the transport time and variation in it, e.g., a standard deviation are output and the record data is processed as a weighted distribution so that a weight of the recent record data is greater than that of the past record data.

(2) A transport time estimating input data creating function: choose one method from choices a to c (a) Create based on the past record data.

(b) Create based on the past record data and the data (corrected data of the congestion state of the traveling route and the like) at the time of forming the transport scenario.

(c) Create based on the past record data, the data at the time of forming of the transport scenario, and predicted data according to the transport scenario.

The predicted data according to the transport scenario is used for predicting the congestion state of the traveling route by estimating points and times of future pickup and setting down.

A vehicle allocating function is a function for carrying out vehicle allocation based on the transport scenario and estimation of the transport time in order to efficiently carry out the transport and is achieved by the vehicle allocation processing section 26. This function includes the following elements.

(1) An empty transport vehicle estimating function based on the scenario

A function of estimating a point and a time at which the transport vehicle currently in use becomes empty from the transport scenario executed by the transport system in order to efficiently carry out the transport: the empty transport vehicle is used for vehicle allocation.

(a) Estimate the time and point (or bay) at which the transport vehicle becomes empty. For this purpose, the transport time estimating function is used.

(b) A vehicle allocation executing function (i) In the vehicle allocation control, not all of the transport vehicles during setting-down traveling toward the bay are counted as the available transport vehicles to which the transport instruction can be allocated. This function limits the available vehicles to the transport vehicles that can finish setting down in a vehicle allocation control term, i.e., a unit term of the vehicle allocation control. The transport vehicles that finished setting down before the vehicle allocation control term and are traveling around in the bay are targeted for vehicle allocation.

(ii) A point and time at which the transport request will be issued in the future, e.g., pickup point and time from a stopover buffer, and a point and time at which the transport vehicle currently in transport traveling will finish setting down and become empty are compared with each other, the points and times predicted from the transport scenarios. Then, vehicle allocation is carried out by designating the transport request issued point as a traveling destination after the finish of setting down so that the transport vehicle currently in transport traveling can travel to the point by taking the shortest way or the shortest time after the finish of setting down.

(2) A transport request issue estimating function based on the scenario

The point and time at which the transport request will be issued in the future are estimated from the transport scenarios and especially the transport scenario in execution and vehicle allocation is carried out so that an empty transport vehicle arrives at the transport request issued point at the estimated time.

(a) Estimation of the time when the transport request is issued

The allocating time setting function in forming of the transport scenario is used.

(b) Execution of the vehicle allocation (i) The number of transport requests issued from the bay in the vehicle allocation control term is subtracted from the number of available transport vehicles calculated in the vehicle allocation control. The remaining number is the net number of available transport vehicles. To keep this value in a proper range, surplus transport vehicles are allocated to the intra-bay route or the inter-bay route where the net number of available transport vehicles is insufficient. If the net number of available transport vehicles is insufficient, vehicles from other traveling routes are allocated.

(ii) A point and a time at which the transport request will be issued in the future and a point and a time at which the transport vehicle currently in transport traveling will finish setting down and become empty are compared with each other, the points and times predicted from the transport scenarios. Then, vehicle allocation is carried out so that the transport vehicle currently in transport traveling can travel to the transport request issued point by taking the shortest way or the shortest time after the finish of setting down.

(3) A function of estimating transport times for all transport requests

For transport request for which transport scenarios are not formed, setting-down finish times are estimated by estimating transport times, points and times at which the transport vehicles become empty after the finish of setting down are estimated, and vehicle allocation is carried out in advance.

(a) For estimation of the time when the transport vehicle becomes empty, the transport time estimating function is utilized.

(b) Execution of vehicle allocation (i) In the vehicle allocation control, not all of the transport vehicles during setting-down traveling toward the bay are counted as the available transport vehicles but only the transport vehicles that can finish setting down in the vehicle allocation control term are counted.

(ii) A point and a time at which the transport request will be issued in the future and a point and a time at which the transport vehicle currently in transport traveling will finish setting down and become empty are compared with each other, the points and times predicted from the transport scenarios. Then, vehicle allocation is carried out so that the transport vehicle currently in transport traveling can travel to the transport request issued point by taking the shortest way or the shortest time after the finish of the setting down.

A data managing function is achieved by the data management section 14 and collects, processes, and manages data for supporting the above respective functions.

Basic ideas of the embodiment will be described.

A transport scenario is formed based on a premise that the transport time estimated in the transport time estimation surely or probably becomes reality. If a deviation from the schedule or the like in the scenario arises, a revision is made to achieve the JIT transport.

Stopover buffer(s) is (are) set provisionally in an order according to a buffer selection logic. If there is a transport scenario that can achieve the JIT transport by stopping over at the buffer(s), the scenario is used. If there is no scenario that can achieve it, the stopover buffer(s) is (are) changed.

If it is assumed that the JIT transport is difficult to achieve, processing as a normal transport request or the like according to conventional transport control is performed. In this way, a JIT transport success rate is increased.

Distribution of the transport times is estimated from an average value and a variance of the transport times obtained from past record values and the variance is treated as a risk factor for early arrival or a delay. Based on the estimated value, the transport scenario is formed.

Revision of the transport scenario is made immediately before arrival at the transport destination buffer in the basic transport "From" (revision 1) and immediately after the finish of setting down at the buffer in the basic transport "From" (revision 2).

Revision 1: Determine whether to execute the transport through the stopover buffer(s) according to the assumption made in forming the transport scenario or to switch to the direct transport.

Revision 2: Execution timing (allocation timing) is changed based on the latest estimated transport time for the basic transport "To".

The above basic ideas may be corrected as follows.

Based on the distribution of the transport times and a premise that a penalty is minimized, the schedule in the transport scenario is made and the transport scenario is revised. The penalty is evaluated based on a composition product and the like of a distribution of arrival times and an evaluation function (penalty function).

Achievement of the JIT transport is determined to be difficult based on a fact that a penalty expected value at the transport source or the transport destination is greater than or equal to a predetermined value for an arbitrary stopover buffer in a range of the buffer selection logic.

As the basic transport processing start timing, optimum timing with which the penalty becomes minimum is selected in consideration of the distribution of the transport times.

If the transport scenario fixed to minimize the transport source/destination penalty is difficult to achieve because the stopover buffer is occupied, another stopover buffer is used.

Figure 6:
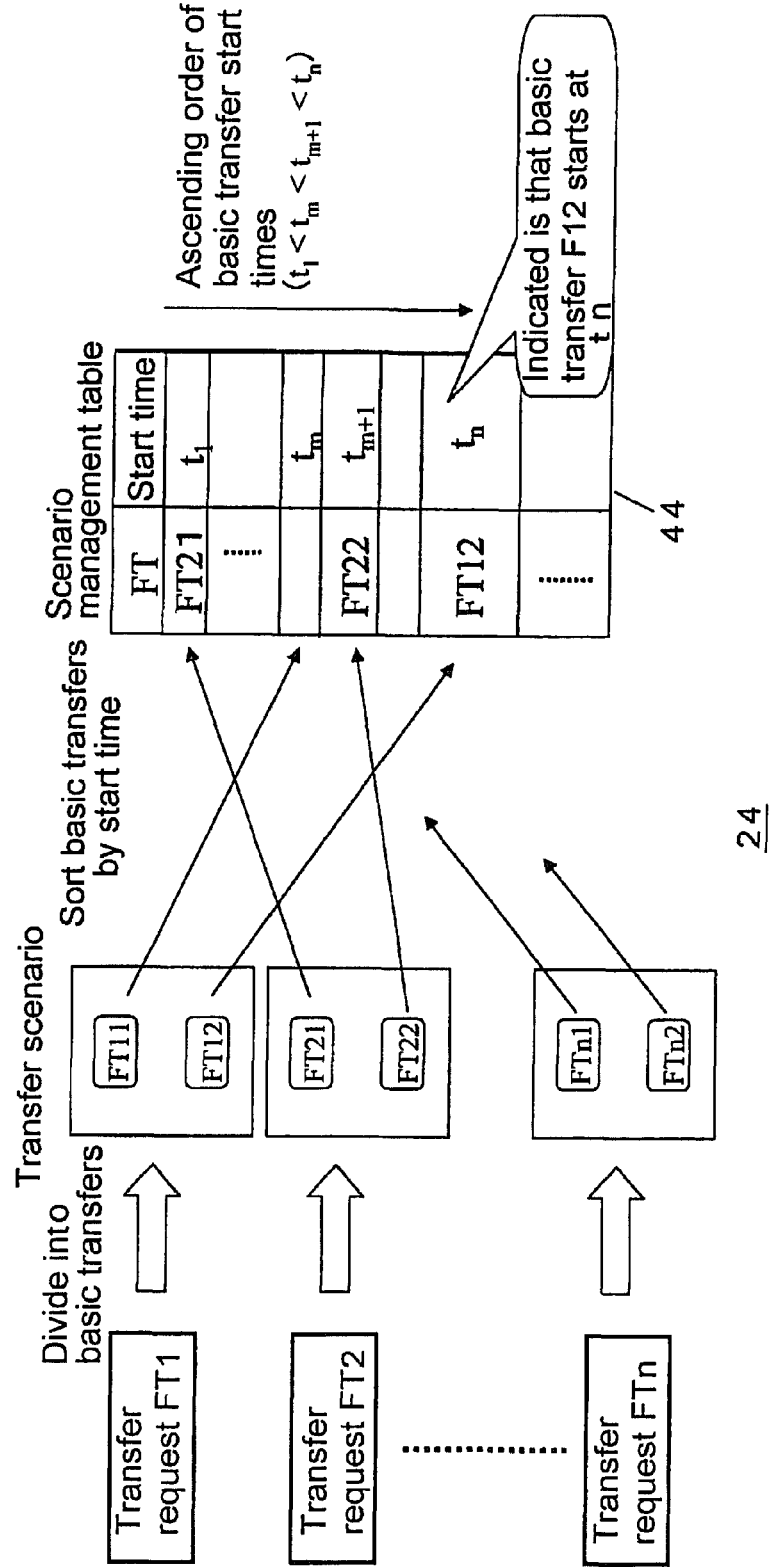
FIG. 6 is a view showing management of the transport scenario in the embodiment.

FIG. 6 shows a management table 44 of the transport scenario in the transport scenario execution management section 24. As already described, the JIT transport request is divided into two basic transports (FT11, FT12, and the like), for example, and the transport scenarios formed in the transport scenario forming section 20 are stored in the transport scenario execution management section 24. A table in which the respective basic transports are sorted by the start time (allocation timing) is the transport scenario management table 44. In the table 44, IDs and the start times of the respective basic transports are recorded and a meaning of the start time is illustrated in the transport scenario 40 in FIG. 3.

Figure 7:
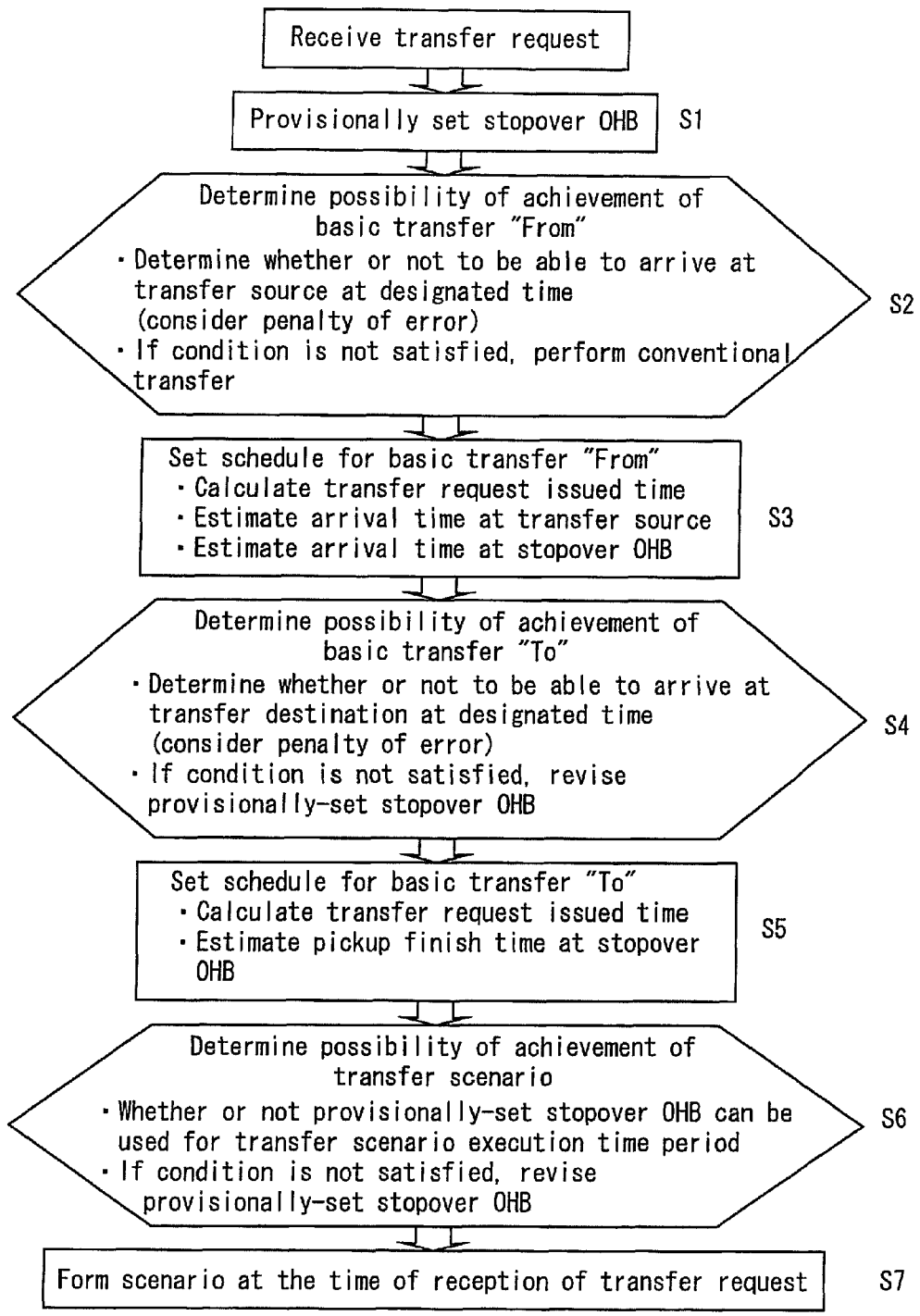
FIG. 7 is a flow chart showing a forming algorithm of the transport scenario in the embodiment.
Figure 8:
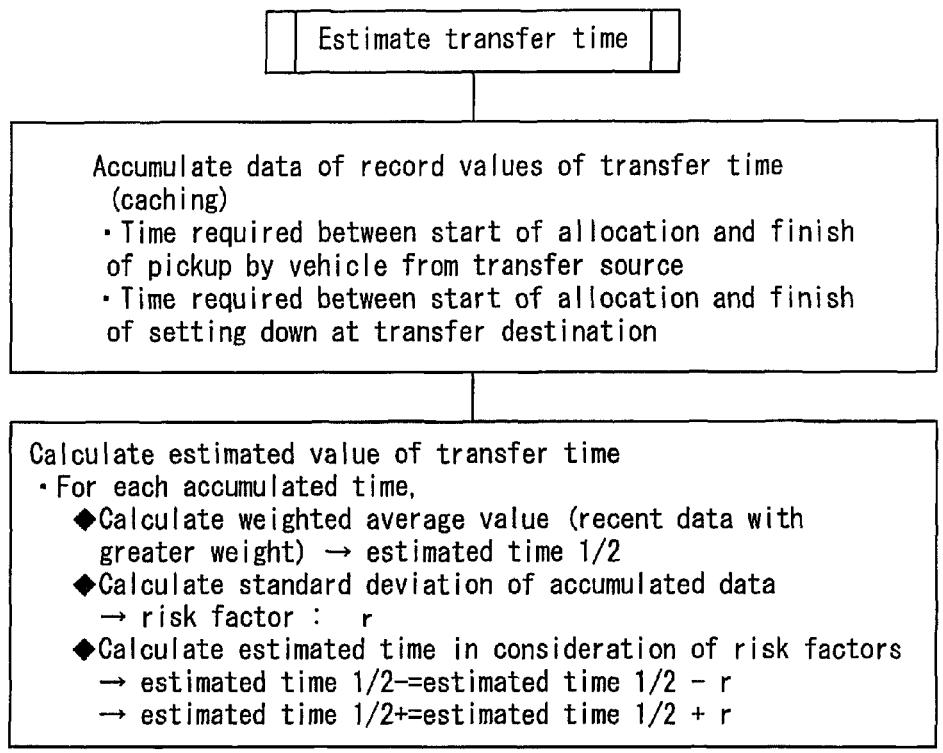
FIG. 8 is a flow chart showing an estimation algorithm of a transport time in the embodiment.

FIG. 7 shows a transport scenario forming algorithm. Assumptions are made that a JIT transport request has been received from a production controller and that arrival times are designated for both basic transport "From" and basic transport "To". If the arrival time is designated for only one of them, the transport scenario conforming to the JIT may be formed for it. If a JIT transport is designated for the basic transport "To", an arrival time at a stopover buffer (stopover OHB) has to be before a pickup time from the stopover OHB in the basic transport "From".

In step 1, the stopover OHB is set provisionally. It is a buffer through which the article can be transported to a transport destination loading and unloading port in the shortest time. In step 2, possibility of achievement of the basic transport "From" is determined. In other words, whether or not a transport vehicle can arrive at a transport source loading and unloading port at a designated time is determined. If a penalty function is given, whether or not an evaluation value in the penalty function is greater than or equal to a predetermined value is evaluated. It is possible to set a stopover buffer a standard deviation (risk factor) of a transport time from which to the transport destination loading and unloading port is in a range of a predetermined time. If the basic transport "From" is possible, a schedule for the basic transport "From" is set (step 3). In the schedule, a transport request issued time (allocating time to the transport vehicle) is calculated and it is calculated so that the transport vehicle arrives at the transport source at the designated time with the evaluation value of the penalty function not over the predetermined value. Based on this, an arrival time at the stopover buffer is estimated. In step 4, possibility of achievement of the basic transport "To" is determined, that is determination whether or not the transport vehicle can arrive from the stopover buffer at the transport destination loading and unloading port at a designated time with an evaluation value of the penalty function not over a predetermined value. Evaluation of the penalty function may be omitted and only an average of arrival times may be estimated.

If the distribution of the transport times of the basic transport "To" is wide due to a distance or the like of the stopover buffer from the transport destination loading and unloading port, the evaluation value of the penalty function may become greater or equal to the predetermined value. In this case, the stopover buffer is revised and, with this revision, the scenario for the basic transport "From" is also changed. If the basic transport "To" is possible, a schedule for it is set in step 5. From a designated time when the transport vehicle should arrive at the transport destination, a time when the transport vehicle should finish pickup at the stopover buffer, a time when the transport vehicle should arrive at the stopover buffer, and a time when a transport instruction should be allocated to the transport vehicle are calculated back. Next, in step 6, whether or not the provisionally-set stopover buffer can be used for a necessary time period in a transport scenario execution time period. If it cannot be used, the processing returns to step 1 where the stopover buffer is revised and the items of processing in step 2 and steps after that are repeated. The schedule obtained by the above processing is stored to finish forming of the transport scenario (step 7).

Figure 9:
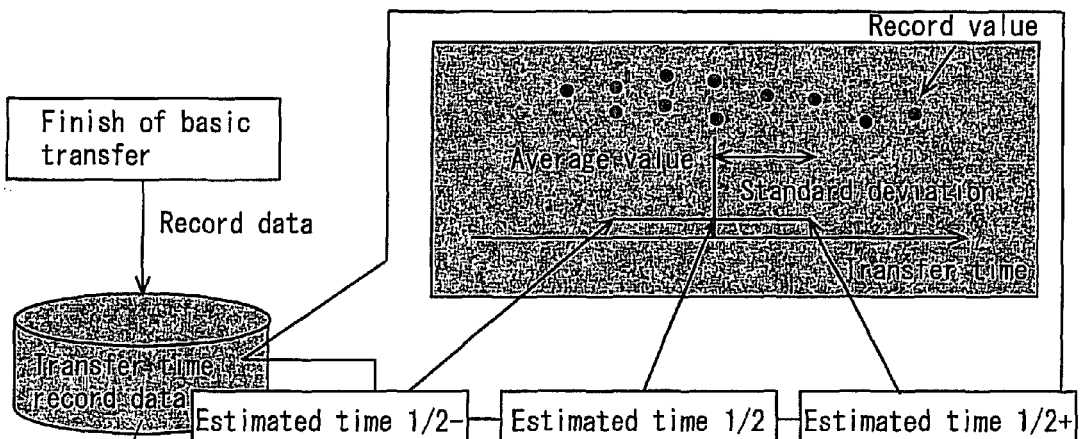
FIG. 9 is a view schematically showing data in a transport time record database in the embodiment.

FIGS. 8 to 12 show an estimation algorithm of a transport time. As a basis of estimation of the transport time, data of record values of the transport time is accumulated and stored in a database 46 in FIG. 9. There are two kinds of transport times, i.e., time between allocation of the transport vehicle and completion of pickup at the transport source and time between allocation of a transport to the transport destination and the finish of setting down. From the accumulated transport times, an average transport time is calculated. The average may be a simple average value but is preferably a weighted average value so that a weight of the recent data becomes greater. Moreover, a standard deviation or the like is calculated as distribution of the transport times. In calculation of the standard deviation, it is preferable that a weight of the recent data is greater. Next, based on the standard deviation, a risk factor +r and a risk factor −r representing variation in the transport time are obtained. The risk factors +r, −r are the standard deviation itself or the double of it. If the distribution of the arrival times is different from a normal distribution, the risk factor −r indicating early arrival and the risk factor +r indicating late arrival may be different values from each other. In this way, as an estimated value of the transport time, an intermediate value, the risk factor +r, and the risk factor −r are obtained. FIG. 9 is a diagrammatic illustration of the processing in FIG. 8.

FIG. 10 shows an example in which data of inter-point traveling velocity of the traveling vehicle is collected and an average and a variance (standard deviation) of the end-to-end traveling time is calculated. Data of inter-point traveling velocity of each transport vehicle is collected in step 10 and the inter-point traveling time is calculated from the inter-point distance and traveling velocity in step 11. If an assumption is made that the inter-point traveling velocity is independent of another inter-point traveling velocity, an average and a variance of the inter-point traveling times are calculated in step 12 and an inter-point traveling time and a variance are predicted by means of exponential smoothing using past record data as initial values or a Kalman filter technique in step 13. The average and the variance of the end-to-end (e.g., from a current position of the transport vehicle to a pickup point, or from a pickup point to a setting-down point) traveling times can be obtained by respectively adding the inter-point traveling time and the variance (step 14).

If an inter-point traveling velocity correlates with an adjacent inter-point traveling velocity, a covariance of an average of the inter-point traveling times and an adjacent inter-point traveling time is calculated in step 15, the inter-point traveling time and the covariance is similarly predicted in step 16, and an average and a variance of end-to-end traveling times are calculated in step 17.

FIGS. 11 and 12 show a calculation algorithm of an average and a variance of inter-point traveling times from data collected in a term T, that is used for sorting data. Inter-point traveling times are collected from each transport vehicle in step 20 and traveling times from the data collected in the term T are sorted according to pairs of points in step 21. The data sorted in this manner is shown in an upper right part of FIG. 11. Next, an averages and a variance of inter-point traveling times are calculated based on data collected for each point pair (step 22). Data obtained in this manner is shown in a middle right part of FIG. 11. In step 23, an average of traveling times to a transport source is predicted by means of exponential smoothing, for example. A predicted value of an average of traveling times at a point i and a point j in a term T+1 is determined by the sum of a product obtained by multiplying a predicted value of an average in a term T−1 by a coefficient α and a product obtained by multiplying a record average of traveling times between the points i and j in a term T by (1−α). An example of prediction of the traveling time between the points in this case is shown in a lower right part of FIG. 11.

Moving on to FIG. 12 from a connector A, a variance of the inter-point traveling times is predicted by means of exponential smoothing. A predicted value of a variance of the traveling times between the point i and the point j in the term T+1 is determined by the sum of a product obtained by multiplying a predicted value of a variance in the term T by a coefficient α and a product obtained by multiplying a record value of the variance in the term T by a coefficient (1−α). If the traveling time between the points can be assumed to be independent (step 25), an average and a variance of end-to-end traveling times can be predicted from predicted values of the average and the variance of the inter-point traveling times. An example of prediction of the average value and the variance of the traveling times is shown on a right side in FIG. 12.

FIG. 13 shows examples of penalty functions for time differences of the finish of pickup and the finish of setting down from designated time periods in the JIT transport request. The penalty function is zero when the transport is finished in the designated time period and the penalty increases with the time difference from the designated time period, for example. The penalty may symmetrically increase in earlier and later cases than the designated time period. Alternatively, the penalty may be greater in the later setting down than in the earlier one with respect to the designated time period and the penalty may be greater in the earlier pickup with respect to the designated time period, for example. However, in a case of trying to carry out setting down or pickup earlier than the designated time period, the transport vehicle may wait before the loading and unloading port and does not hinder the JIT transport itself. In this case, the penalty actually means a penalty for congestion in the traveling route due to stopping of the transport vehicle.

FIG. 14 shows calculation of an evaluation value for evaluating possibility of achievement of the basic transport. If assumptions are made that a penalty function g (t) is given as shown on the right side in FIG. 14 and that distribution of times at which empty transport vehicle arrives at a transport source is fli(t) (e.g., normal distribution estimated from the risk factors), it is possible to obtain the evaluation value C1(T) from a composition product. Then, if there is a transport vehicle with an evaluation value C1(T) not over a predetermined value, the basic transport "From" can be achieved. If there are a plurality of available transport vehicles, evaluation values of the respective transport vehicles are obtained and the basic transport "From" is allocated to the transport vehicle with the smallest evaluation value. Although the evaluation value of the arrival time at the transport source is calculated in FIG. 14, an evaluation value of a setting-down time at a transport destination is calculated in the same way. In evaluation of the penalty, the sum of evaluation values g(τ+r)+g (τ−r) at estimated arrival times τ+r, τ−r (+r, −r are risk factors) may be used, for example.

Figure 15:
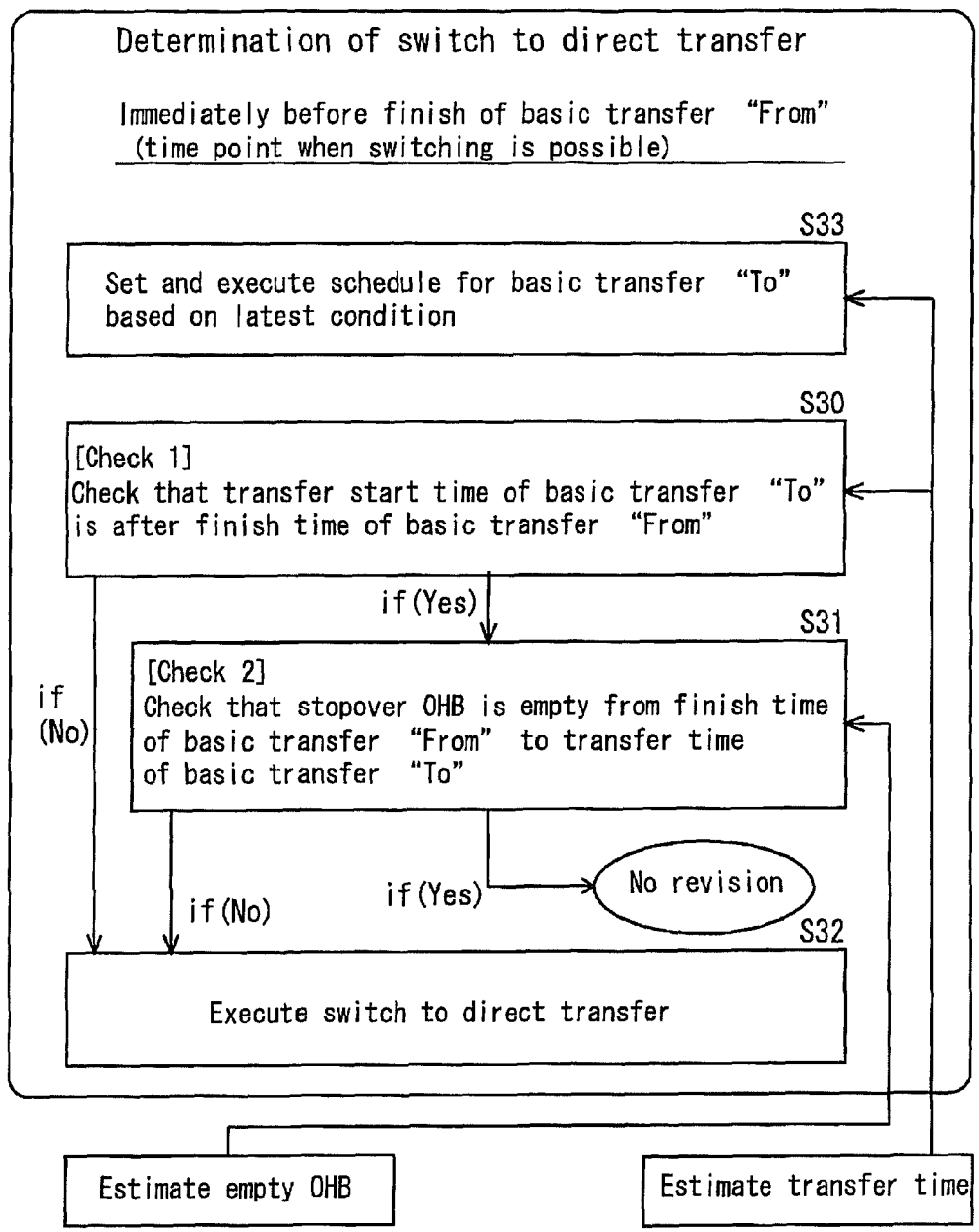
FIG. 15 is a view showing an algorithm for switching from just-in-time transport to a direct transport in the embodiment.

The transport scenario execution management section 24 in FIG. 1 determines whether to separately execute the basic transport "To" or to switch to the direct transport immediately before the finish of the basic transport "From" so that JIT transport can be achieved in the event of congestion in the traveling route and in any other unexpected events. A switching algorithm to the direct transport is shown in FIG. 15. In step 30, whether the transport of the basic transport "To" is started after the finish time of the basic transport "From" is checked. In a case of "YES", whether the stopover buffer is empty until pickup is carried out in the basic transport "To" after the finish of the basic transport "From" is checked in step 31. In a case of "NO" in one of step 30 and step 31, the switch to the direct transport is made (step 32). In this case, the transport vehicle that is carrying out the basic transport "From" continues to travel to the setting-down destination of the basic transport "To" and carries out setting down at the designated time. Because the transport vehicle arrives at the setting-down destination before the designated time, processing such as waiting before the setting-down destination and delaying of the arrival time by changing the traveling route is performed according to a predetermined value if the evaluation value in FIG. 14 is greater than or equal to the predetermined value. Even in a case where the switch to the direct transport is made, the production controller is informed of impossibility of the JIT transport if the evaluation value of the arrival time at the setting-down destination is greater than or equal to the predetermined value. Furthermore, in step 33, the schedule for the basic transport "To" is reset based on the latest conditions. For this processing, availability of the buffer is estimated by using data in the buffer management section and the latest transport time is estimated by utilizing data in the transport time estimation section.

FIG. 16 shows an example of an overhead buffer management table 48. If buffers other than overhead buffers are used, similar management tables are provided for such buffers. In FIG. 16, a current time is t2 and data at and after t3 are predicted values. The table is divided into sections for respective buffer shelves. For each shelf, ID of a transport request that is using the shelf, the fact that the shelf is empty, or ID of a transport request that has reserved the shelf is recorded.

Figure 17:
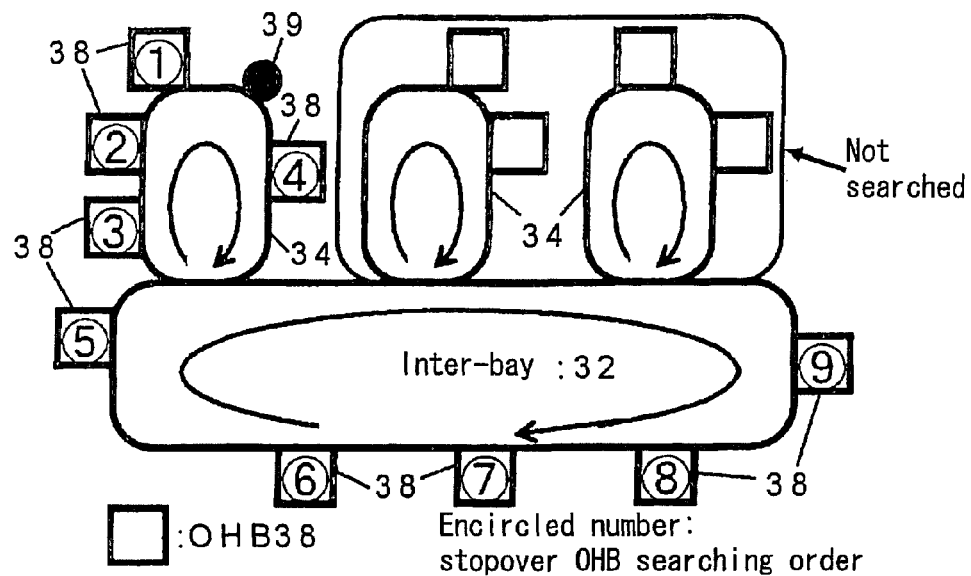
FIG. 17 is a view schematically showing a searching order for an empty buffer in the embodiment.

FIG. 17 shows a search algorithm for a stopover buffer for a transport destination 39 on the intra-bay route 34. The overhead traveling vehicle travels around in one direction on the traveling routes 32, 34 and can freely travel back and forth between the inter-bay route 32 and the intra-bay route 34. Therefore, the same bay is searched for an empty buffer (buffer that is empty for the scheduled time of use), starting from the immediately upstream one to the transport destination loading and unloading port 39 and then going on to more upstream ones. If no suitable empty buffer can be found, the inter-bay route 32 is searched for an empty buffer that is on an upstream side of the intra-bay routes 34 including the transport destination 39.

Figure 18:
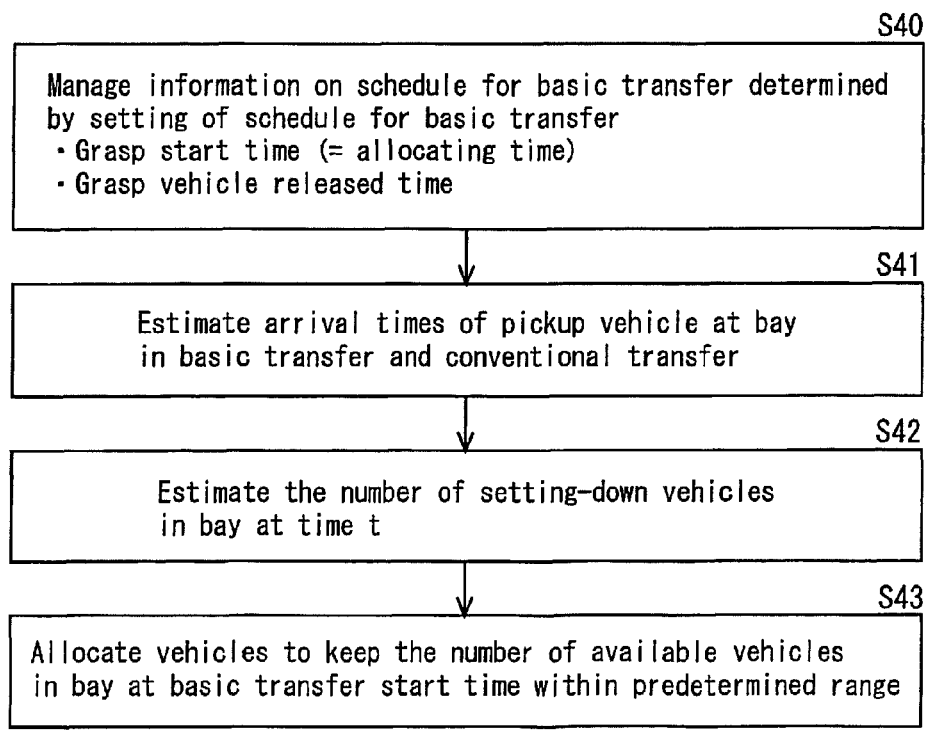
FIG. 18 is a flow chart showing a vehicle allocation algorithm in the embodiment.

FIGS. 18 and 19 show a vehicle allocation algorithm in the embodiment and a management table 50 of the number of allocated vehicles and used for the algorithm. Based on the schedule of the basic transport, the number of vehicles to which the transport instructions should be allocated in each bay at each time is grasped. Moreover, the number of vehicles that have finished setting down and become empty in each bay is also grasped (step 40). In step 41, the number of vehicles necessary for pickup in the bay at a certain time and arrival times are estimated in each case of the basic transport and the conventional transport. Furthermore, the number of vehicles that become empty due to setting down within the same bay at a time immediately before the time is estimated, for example (step 42). A unit of time is the term based on which the vehicle allocation is carried out and the transport times are estimated. If a cumulative total of the number of vehicles for carrying out pickup is subtracted from a cumulative total of the number of vehicles that become empty, the number of transport vehicles to which the transport instructions can be allocated freely in the bay is obtained and the vehicle allocation is carried out so that the number is in a predetermined range (step 43).

In FIG. 19, the number of vehicles that arrive for pickup at each time is predicted for each bay at an upper left part. At an upper right part, the number of vehicles that finish setting down and become empty at each time is predicted for each bay. From a difference between them, the number of empty vehicles (the number of available transport vehicles) to which the transport instructions can be allocated in each bay at each time is predicted. If the number of available transport vehicles is smaller than a predetermined value, e.g., a minus number, the empty transport vehicles are called into the bay. If the number of available transport vehicles exceeds the predetermined value, the transport vehicles are moved to other bays.

Figure 20:
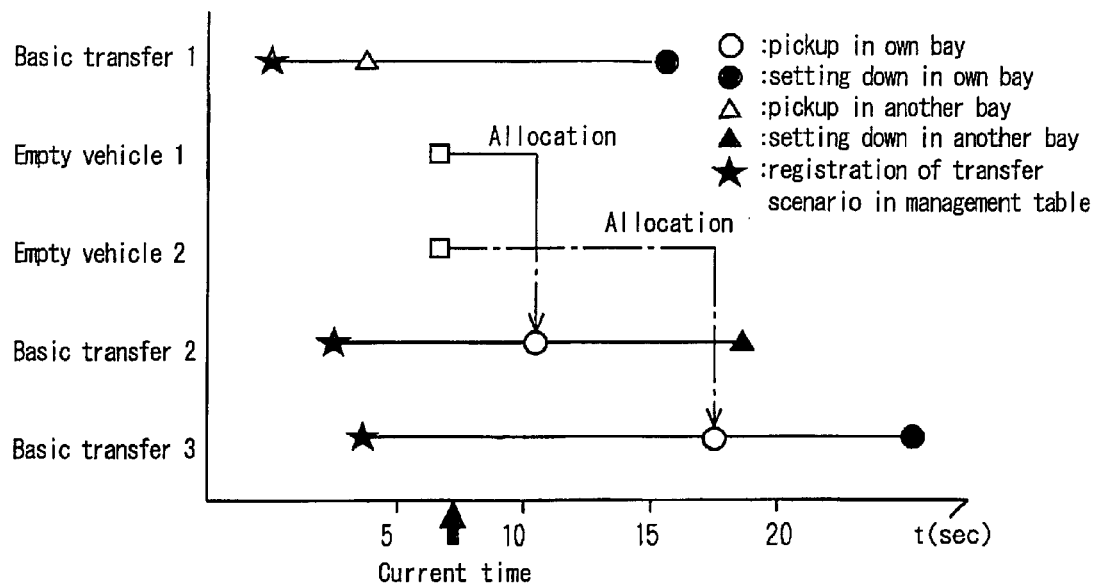
FIG. 20 is a graph schematically showing vehicle allocation control in the embodiment.

FIG. 20 shows the vehicle allocation algorithm in the embodiment for one bay. Here, the vehicle allocation control term T is 5 seconds, for example, there are two empty vehicles, i.e., an empty vehicle 1 and an empty vehicle 2, at a current time, and allocation of vehicles necessary for times 15 to 20 seconds that is two terms after the current term, for example, is prepared. Because one empty vehicle is necessary in a basic transport 2 at times 10 to 15 seconds in the next term, the empty vehicle 1 is allocated to this. Because another empty vehicle is necessary at the times 15 to 20 seconds, the empty vehicle 2 is allocated to this. Because a basic transport 1 is finished and one empty vehicle becomes available in the own bay in the same term, the number of available transport vehicles at the times 15 to 20 seconds is the basic transport 1+the empty vehicle 2−a basic transport 3=1. To keep this value in a proper range, surplus transport vehicles are expelled into other bays or the like and a transport vehicle for satisfying a need is called from another bay or the like. Although management of the number of available transport vehicles for the JIT transport is shown here, it is possible to prepare a transport vehicle in advance by the vehicle allocation control for every transport if a time at which the transport vehicle becomes empty due to setting down and a time at which an empty vehicle becomes necessary for pickup can be predicted for the transport. Even if the time at which the transport vehicle carries out pickup cannot be predicted, a time at which a transport vehicle becomes empty due to setting down in response to an already allocated transport instruction can be predicted. Therefore, if the number of vehicles that become empty in a certain bay in a control term is large, the empty vehicles can be expelled. If the number is small, it is possible to call an empty vehicle from another bay.

Figure 21:
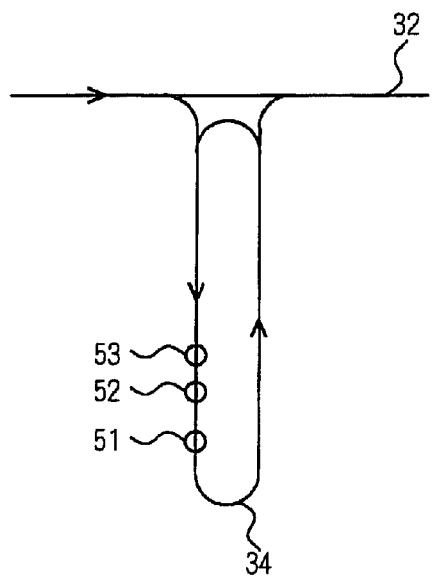
FIG. 21 is a view schematically showing a situation where there are a plurality of traveling destinations within a same bay in the embodiment.
Figure 22:
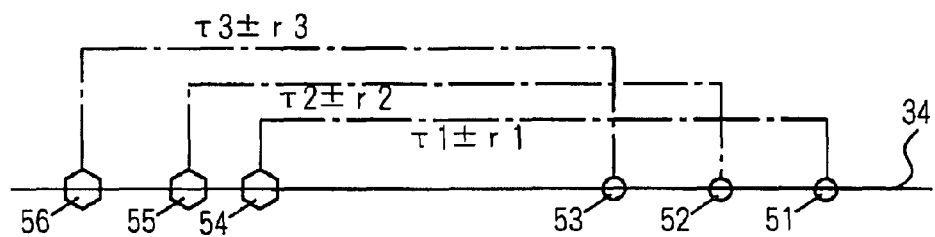
FIG. 22 is a view schematically showing positional relationships between destination points and transport vehicles in the case of FIG. 21.

FIGS. 21 and 22 show an allocation order of the transport instructions such as basic transport instructions in a case where there are a plurality of destination points within the same bay. The destination points are points for pickup or points or setting down and destination points 51 to 53 are shown as examples in FIGS. 21 and 22. If the transport instructions are allocated to overhead traveling vehicles 54 to 56 in FIG. 22, the leading downstream overhead traveling vehicle 54 is allocated to the downstream destination point 51, the intermediate overhead traveling vehicle 55 is allocated to the intermediate destination point 52, and the upstream overhead traveling vehicle 56 is allocated to the upstream destination point 53 in the intra-bay routes 34 so as not to cause congestion in the intra-bay route 34. If estimated values of traveling times to the respective points are τ1±r1, τ2±r2, and τ3±r3 and if the overhead traveling vehicles 54 to 56 start traveling to the destination points 51 to 53 immediately after the transport instructions are allocated to them, the respective sum of the allocating times and τ1, τ2, and τ3 and their distributions ±r1 to r3 need satisfy predetermined conditions in a case where there are designated values of the arrival times.

Figure 23:
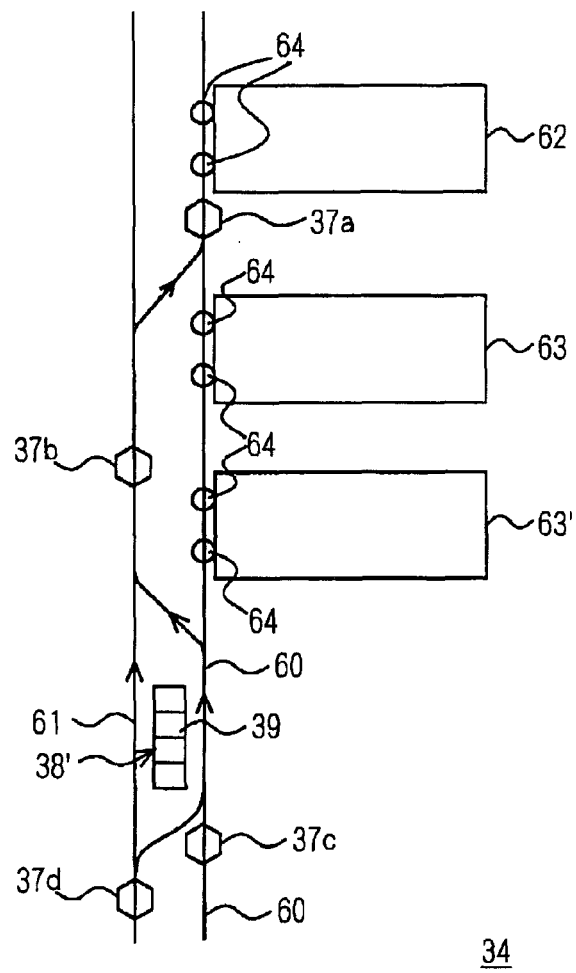
FIG. 23 is a view showing examples of waiting positions of the transport vehicles in the embodiment.

FIG. 23 shows an example of waiting positions in the vehicle allocation, where the intra-bay route 34 has two tracks and is formed of two parallel traveling rails 60, 61 oriented in the same direction. Reference numeral 62 designates a processing device, and issue of a basic transport "From" for carrying out pickup is scheduled from the processing device 62. Reference numerals 63 and 63' designate other processing devices. Reference numerals 64 designate loading and unloading ports of the processing devices 62, 63, and 63'. Reference numeral 38' designates a buffer from which pickup is scheduled to be carried out in a basic transport "To" and from a shelf 39 of which pickup is carried out. Overhead traveling vehicles have access to the buffer 38' from the traveling rail 60 but do not have access from the traveling rail 61. If the traveling rail 61 is a passing rail where the vehicles cannot stop and wait while the vehicles can stop and wait on the traveling rail 60, overhead traveling vehicles 37a, 37c are caused to wait on an immediately upstream side of the pickup point for the basic transport in which the processing device 62 and the shelf 39 are pickup positions on the traveling rail 60. On the other hand, if the vehicles can wait on the traveling rail 61, the overhead traveling vehicle 37b for the processing device 62 and the overhead traveling vehicle 37d for the shelf 39 are caused to wait on upstream sides of the pickup points as shown in the drawing. In these cases, the vehicles are allocated on the immediately upstream sides of the pickup points and traveling times from the allocated positions to the pickup points do not become problems.

If the overhead traveling vehicle cannot stop and wait, the allocated overhead traveling vehicle is caused to wait while traveling around on the intra-bay route 34. In this case, the transport instruction such as the basic transport is allocated to the overhead traveling vehicle when an estimated traveling time from a current position of the overhead traveling vehicle to a pickup point becomes substantially equal to a difference between arrival time at the pickup point in the transport scenario or the like and current time. If there are a plurality of basic transports that are expected to be issued in the same intra-bay route in the future and there are a plurality of overhead traveling vehicles allocated for them, the problem is which overhead traveling vehicle should be allocated to which basic transport or the like. To address this problem, it is only necessary to prevent the overhead traveling vehicle to which the basic transport or the like is allocated and which stops at the pickup point from obstructing traveling of vehicles following the vehicle and the transport instructions may be allocated in the order described in FIGS. 21 and 22. In these cases, vehicles are allocated for each intra-bay route, the traveling time from the current position of each of the overhead traveling vehicles to the pickup point is estimated, and the basic transport "From", "To", or the like is allocated to comply with the transport scenario.

At the time of vehicle allocation, it is necessary to predict the number of vehicles that become empty in the bay. As described above, the number of overhead traveling vehicles is predicted from the number of transport instructions in execution. If the sum of the number of the basic transports "From" and basic transports "To" which use the loading and unloading ports or buffers on the intra-bay route as setting-down points, i.e., the sum of the transport instructions which are in execution or which have been allocated to setting-down points on the intra-bay route is obtained, this is equal to the number of vehicles that will become empty in a period substantially equal to an average transport time. Therefore, it is the easiest way to count the number of allocated transport instructions whose setting down points are on each intra-bay route to predict times and positions at which the vehicles become empty. In addition, finish times of the allocated transport instructions may be estimated to further accurately predict the times at which the vehicles become empty.

Although the respective processing devices and the respective bays have been described as equals in the embodiment, there may be important bays and unimportant bays or important processing devices and unimportant processing devices. In this case, scenarios of JIT transports are preferentially formed for the important processing devices and bays.

Prediction of issue of the transport instructions is easy if there are transport scenarios as in the basic transports "From" and "To". If there is no scenario, the prediction may be made on an assumption that a processed article need be carried out after the passage of cycle time of the processing device after the article is carried in the processing device. Alternatively, the prediction may be made from statistics on issue of the transport instructions in each intra-bay route.

The invention claimed is:

1. A transport system for transporting articles between a plurality of processing devices by a plurality of auto-guided transport vehicles, the system comprising:
   buffers in a plurality of positions along a traveling route of the auto-guided transport vehicles for temporarily storing the articles,
   transport instruction issuing means for issuing two kind of transport instructions: (i) "From" instructions corresponding to transportation instructions from transport source processing devices to stopover buffers, and (ii) "To" instructions corresponding to transportation instructions from the stopover buffers to transport destination processing devices, the "To" instructions having designated arrival times at the transport destination processing devices and being input from outside the transport system,
   allocation means for allocating the transport instructions to the auto-guided transport vehicles,
   estimating means for estimating times and positions at which the auto-guided transport vehicles will become empty (i) at the stopover buffers after performing the "From" instructions, and (ii) at the transport destination processing devices after performing the "To" instructions,
   predicting means for predicting the times and the positions at which the transport instructions will be issued in the future, based on at least the "To" instructions, and
   auto-guided vehicle allocating means for running empty auto-guided transport vehicles, based on the times and positions estimated by the estimating means at which the auto-guided transport vehicles will become empty, and for allocating the empty auto-guided transport vehicles to be transported based on instructions that will be issued in the future, in accordance with the times and the positions predicted by the predicting means at which the transport instructions will be issued in the future.

2. A transport system according to claim 1,
wherein the traveling route includes a plurality of intra-bay routes along bays with the processing devices and an inter-bay route connecting the intra-bay routes, and
wherein the auto-guided vehicle allocating means allocates the empty auto-guided vehicles from another part of the traveling route to an intra-bay route based on a difference between a number of issues of the transport instructions with pickup positions in the intra-bay route and a number of the auto-guided transport vehicles that become empty on the intra-bay route estimated by the estimating means.

3. A transport system according to claim 1,
wherein said allocation means estimates traveling times from current positions to pickup positions of the auto-guided transport vehicles allocated by the auto-guided vehicle allocating means and allocates the transport instructions to the auto-guided transport vehicles so that the auto-guided transport vehicles arrive at the pickup positions at predetermined times based on the traveling times estimated by the allocation means.

4. A transport system according to claim 2,
wherein the predicting means predicts the number of the auto-guided transport vehicles that become empty in each intra-bay route from the number of allocated transport instructions whose transport destinations are on the intra-bay route.

5. A transport method for allocating transport instructions to a plurality of auto-guided transport vehicles by a controller and transporting articles between a plurality of processing devices by the auto-guided transport vehicles comprising:
  providing buffers in a plurality of positions along a traveling route of the auto-guided transport vehicles for temporarily storing the articles,
  issuing two kind of transport instructions: (i) "From" instructions corresponding to transportation instructions from transport source processing devices to stopover buffers, and iii) "To" instructions corresponding to transportation instructions from the stopover buffers to transport destination processing devices, the "To" instructions having designated arrival times at the transport destination processing devices and being input from outside the transport system,
  allocating the transport instructions to the auto-guided transport vehicles,
  estimating times and positions at which the auto-guided transport vehicles will become empty (i) at the stopover buffers after performing the "From" instructions, and (ii) at the transport destination processing devices after performing the "To" instructions,
  for predicting the times and the positions at which the auto-guided transport instructions will be issued in the future, based on at least the "To" instructions, from the positions of the stopover buffers and pickup times in the transport instructions "To", and
  running empty auto-guided transport vehicles, based on the times and positions estimated by the estimating means at which the auto-guided transport vehicles will become empty, and
  allocating the empty auto-guided transport vehicles to be transported based on instructions that will be issued in the future, in accordance with the times and the positions predicted by the predicting means at which the transport instructions will be issued in the future.

* * * * *